US012689712B2

(12) United States Patent　　　　(10) Patent No.:　US 12,689,712 B2

T N et al.　　　　　　　　　　(45) Date of Patent:　Jul. 21, 2026

---

(54) PEER-TO-PEER SURVEILLANCE CAMERA ARCHITECTURE USING SHARED METADATA DATASTORE

(71) Applicant: Sandisk Technologies, Inc., Milpitas, CA (US)

(72) Inventors: Nischith T N, Bangalore (IN); Surya Sathyanandam, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 33 days.

(21) Appl. No.: 18/901,234

(22) Filed: Sep. 30, 2024

(65) Prior Publication Data

US 2026/0095550 A1　　Apr. 2, 2026

(51) Int. Cl.

| | |
|---|---|
| *H04N 7/18* | (2006.01) |
| *G06V 10/82* | (2022.01) |
| *G06V 20/40* | (2022.01) |
| *G06V 20/52* | (2022.01) |
| *H04N 23/661* | (2023.01) |

(52) U.S. Cl.

CPC ............ *H04N 7/181* (2013.01); *G06V 10/82* (2022.01); *G06V 20/40* (2022.01); *G06V 20/52* (2022.01); *H04N 23/661* (2023.01); *G06V 2201/10* (2022.01)

(58) Field of Classification Search

CPC ...... H04N 7/181; H04N 23/661; G06V 10/82; G06V 20/40; G06V 20/52; G06V 2201/10

USPC ......................................... 348/159; 455/420

See application file for complete search history.

(56) References Cited

U.S. PATENT DOCUMENTS

| | | | |
|---|---|---|---|
| 8,755,785 B2 * | 6/2014 | Gong ................. | H04N 21/4223 |
| | | | 455/420 |
| 11,810,350 B2 | 11/2023 | Xiong | |
| 11,810,361 B2 | 11/2023 | Xiong | |
| 2014/0333775 A1 * | 11/2014 | Naikal ............. | H04N 21/44008 |
| | | | 348/159 |
| 2016/0189500 A1 * | 6/2016 | Kim ................. | G08B 13/19608 |
| | | | 386/223 |
| 2018/0007393 A1 * | 1/2018 | Von Novak .......... | H04N 21/632 |
| 2018/0013658 A1 * | 1/2018 | Wiesmaier .............. | H04L 41/12 |
| 2018/0218582 A1 * | 8/2018 | Hodge ............. | H04N 21/44004 |
| 2021/0118155 A1 * | 4/2021 | Ramakrishnan ........ | G06T 7/292 |
| 2022/0207971 A1 * | 6/2022 | Normann ............ | G06F 16/7335 |
| 2024/0119737 A1 * | 4/2024 | Li ........................... | G06V 20/44 |
| 2024/0153261 A1 * | 5/2024 | Ahmad .................. | G06N 3/045 |
| 2024/0193497 A1 * | 6/2024 | Morales Saiki ..... | G06V 40/178 |
| 2024/0386581 A1 * | 11/2024 | Kamada .................. | G06T 7/292 |

(Continued)

*Primary Examiner* — Hung Q Dang

*Assistant Examiner* — Stephen R Smith

(74) *Attorney, Agent, or Firm* — Patent Law Works LLP

(57)　　　　ABSTRACT

Systems, video cameras, and methods for a peer-to-peer surveillance camera architecture using a shared metadata datastore are described. Each video camera may be configured to detect objects of interest in the video data captured by their respective image sensors and selectively upload metadata from object detection events to the shared metadata datastore. Responsive to detecting an object of interest, each camera may also use the metadata from the object detection to query the datastore for similar events detected by other video cameras. Responsive to the query, the video camera may receive a peer camera identifier and initiate peer-to-peer communication with the identified peer video camera to exchange video metadata directly with that peer video camera.

20 Claims, 7 Drawing Sheets

(56) References Cited

U.S. PATENT DOCUMENTS

| 2025/0008060 | A1 | 1/2025 | Singla |
| 2025/0046084 | A1* | 2/2025 | Yadav | ................... | H04N 23/695 |
| 2025/0184621 | A1* | 6/2025 | Sun | ...................... | H04N 23/661 |
| 2025/0292580 | A1 | 9/2025 | Singla |

* cited by examiner

500

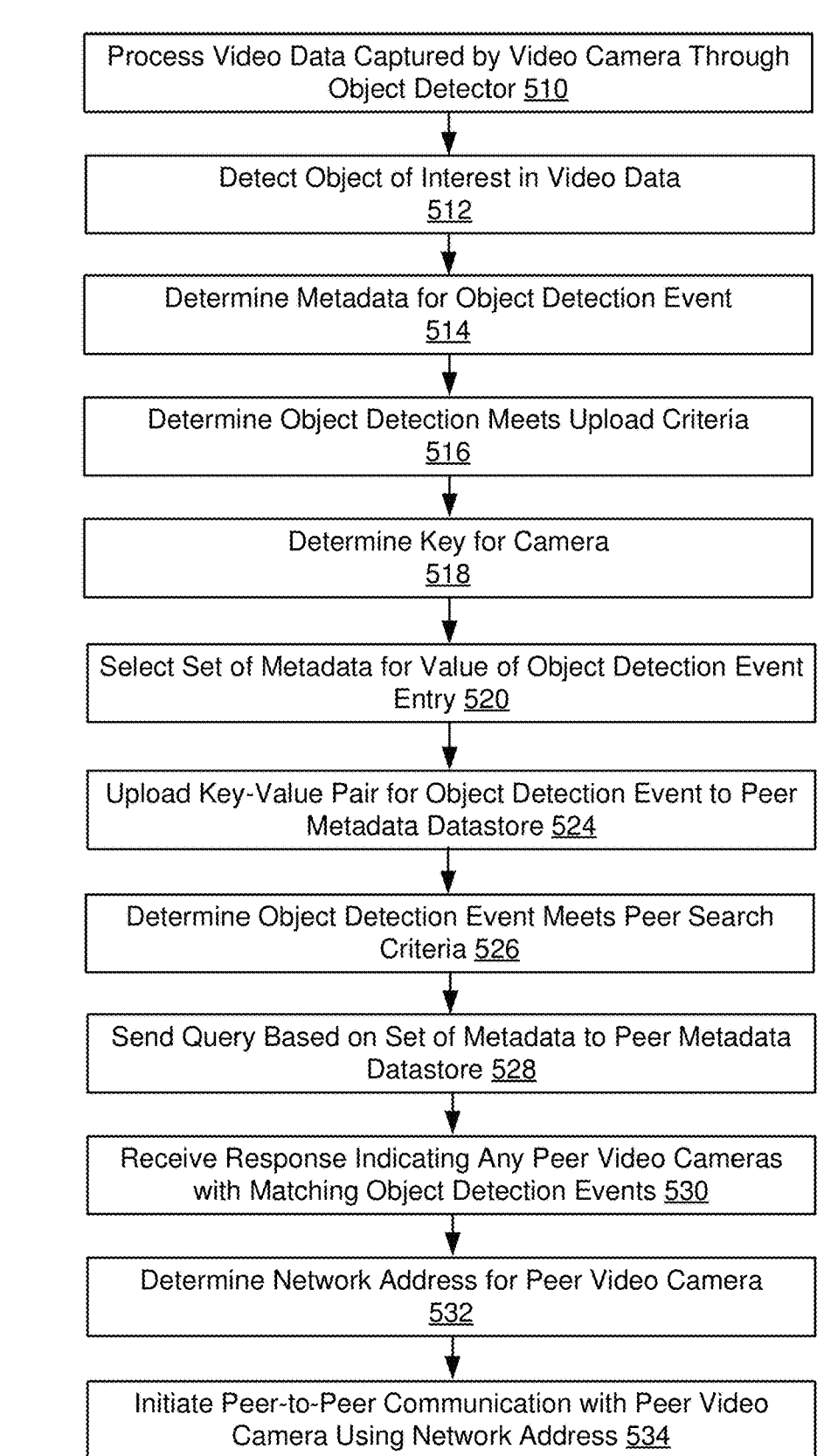

Process Video Data Captured by Video Camera Through Object Detector 510

Detect Object of Interest in Video Data 512

Determine Metadata for Object Detection Event 514

Determine Object Detection Meets Upload Criteria 516

Determine Key for Camera 518

Select Set of Metadata for Value of Object Detection Event Entry 520

Upload Key-Value Pair for Object Detection Event to Peer Metadata Datastore 524

Determine Object Detection Event Meets Peer Search Criteria 526

Send Query Based on Set of Metadata to Peer Metadata Datastore 528

Receive Response Indicating Any Peer Video Cameras with Matching Object Detection Events 530

Determine Network Address for Peer Video Camera 532

Initiate Peer-to-Peer Communication with Peer Video Camera Using Network Address 534

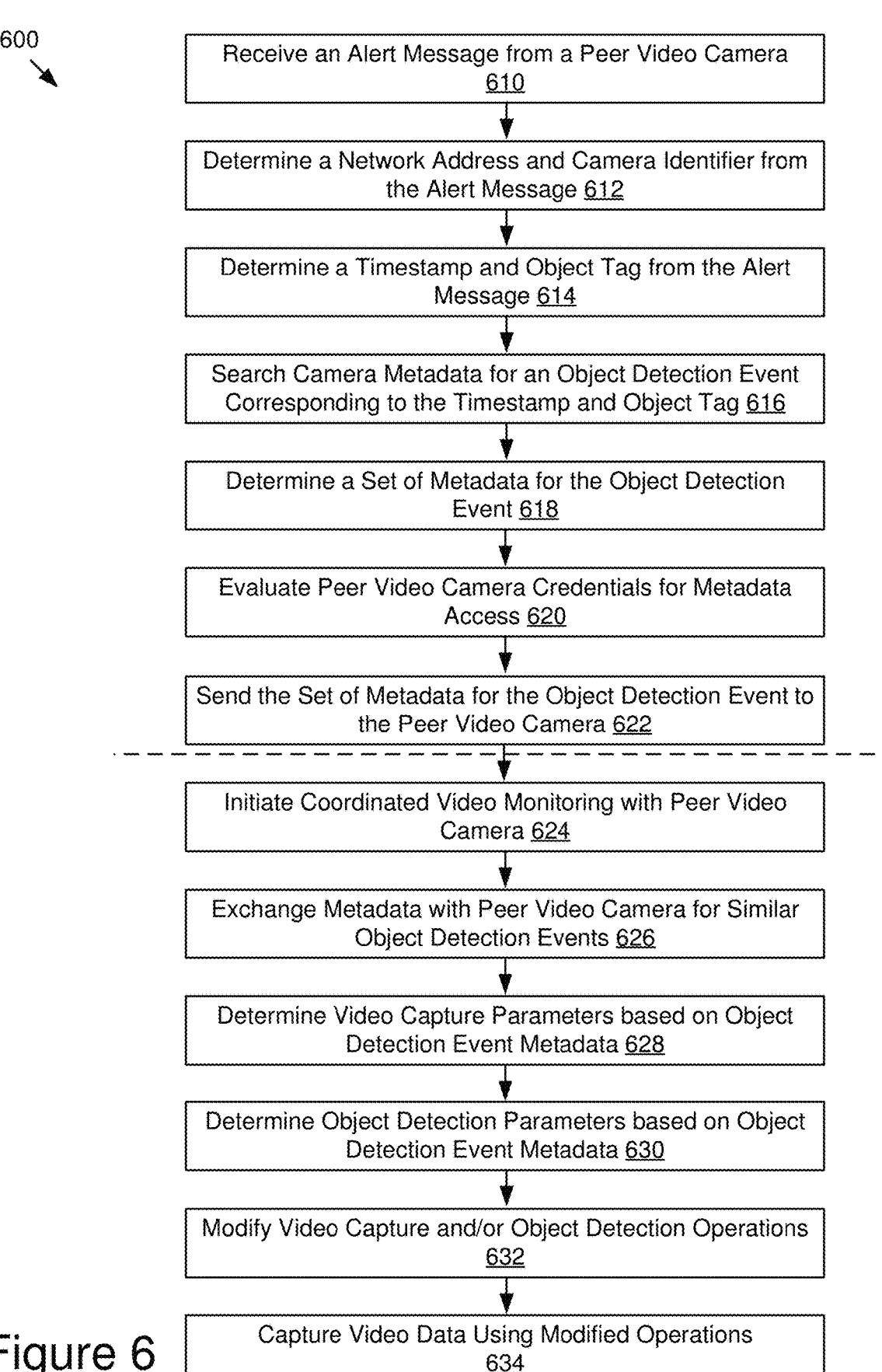

Receive an Alert Message from a Peer Video Camera
610

Determine a Network Address and Camera Identifier from
the Alert Message 612

Determine a Timestamp and Object Tag from the Alert
Message 614

Search Camera Metadata for an Object Detection Event
Corresponding to the Timestamp and Object Tag 616

Determine a Set of Metadata for the Object Detection
Event 618

Evaluate Peer Video Camera Credentials for Metadata
Access 620

Send the Set of Metadata for the Object Detection Event to
the Peer Video Camera 622

Initiate Coordinated Video Monitoring with Peer Video
Camera 624

Exchange Metadata with Peer Video Camera for Similar
Object Detection Events 626

Determine Video Capture Parameters based on Object
Detection Event Metadata 628

Determine Object Detection Parameters based on Object
Detection Event Metadata 630

Modify Video Capture and/or Object Detection Operations
632

Capture Video Data Using Modified Operations
634

Figure 6

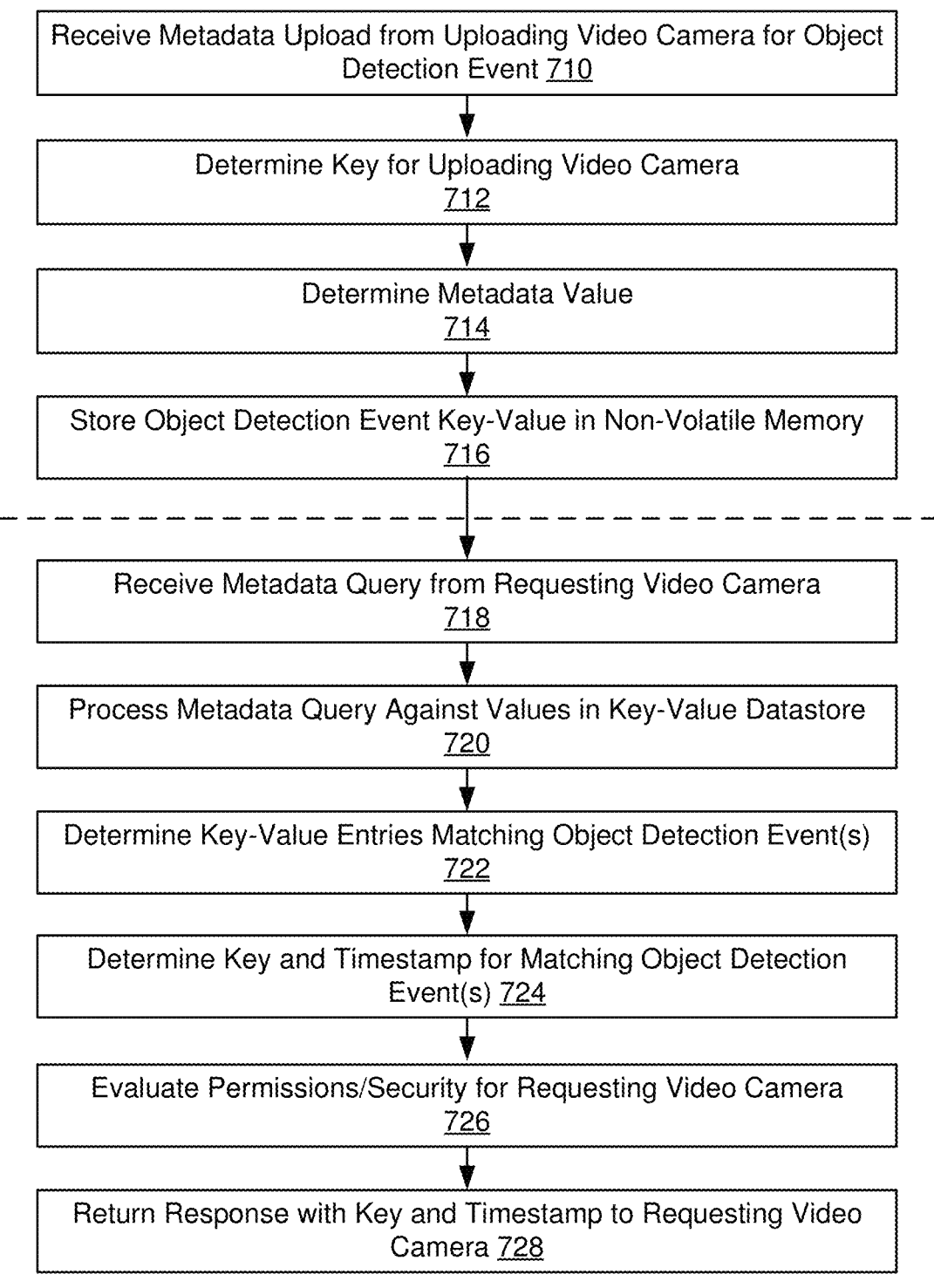

Receive Metadata Upload from Uploading Video Camera for Object Detection Event 710

Determine Key for Uploading Video Camera 712

Determine Metadata Value 714

Store Object Detection Event Key-Value in Non-Volatile Memory 716

Receive Metadata Query from Requesting Video Camera 718

Process Metadata Query Against Values in Key-Value Datastore 720

Determine Key-Value Entries Matching Object Detection Event(s) 722

Determine Key and Timestamp for Matching Object Detection Event(s) 724

Evaluate Permissions/Security for Requesting Video Camera 726

Return Response with Key and Timestamp to Requesting Video Camera 728

PEER-TO-PEER SURVEILLANCE CAMERA ARCHITECTURE USING SHARED METADATA DATASTORE

TECHNICAL FIELD

The present disclosure generally relates to video surveillance systems and, more particularly, to video surveillance systems configured to share video capture parameters with other networked video cameras.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. In some configurations, video may be recorded in onboard memory of the cameras, with or without transfer to a server. Client or user systems are communicatively connected to the server system and/or cameras to request, receive, and display streams of recorded video data and/or related alerts and analytics.

For large and geographically distributed video camera installations, there is a growing desire to decentralize control of video capture and analysis, at least at an initial level. By increasing the onboard capabilities of individual cameras, preliminary storage and analysis of captured video data may be executed within the camera and only escalated to a control center or other end user device when certain event detection thresholds are met.

One feature of distributed surveillance systems is the desire to leverage cameras in different locations to coordinate in identifying and addressing malicious or suspicious activities in real-time. Each camera may include different capture modes, adjustable field of view positioning, analytics, and priorities for video capture operations using their sensor, processing, and memory resources. Prior approaches to coordination may include streaming event video or sending event metadata to a centralized control center to determine whether other cameras in the network may be redeployed to increase the likelihood of capturing additional video data for an object or event of interest. However, these centralized systems may be constrained by network bandwidth and processing capacity that is inadequate in expansive camera networks where numerous simultaneous events unfold.

Systems and methods for predictively modifying video capture operations for selective capture of objects of interest based on data from another networked video camera may be advantageous. Enabling peer-to-peer coordination among video cameras without direction or decision-making by a centralized server may be needed and may benefit from a peer-to-peer surveillance camera architecture that does not require individual cameras to have prior knowledge of the peer camera topology to coordinate with relevant other cameras in the network for any given object detection event.

SUMMARY

Various aspects for a peer-to-peer surveillance architecture using a shared metadata datastore to enable real-time coordination for improved video capture, particularly using metadata queries to identify peer video cameras that have captured similar metadata and initiate coordination with those cameras, are described.

One general aspect includes a system that includes a first video camera including: a network interface configured for communication over a network, where the first video camera is a video camera of a plurality of networked video cameras configured for communication over the network; an image sensor configured to selectively capture video data; a non-volatile storage medium configured to store video data captured by the image sensor; a controller circuit configured to: detect, from the video data, an object of interest; determine, based on the object of interest, a set of metadata corresponding to the object of interest; send, over the network and to a peer metadata datastore, a query may include selected metadata from the set of metadata; receive, responsive to the query, at least one peer camera identifier for at least one other video camera in the plurality of networked video cameras; and initiate, responsive to receiving the at least one peer camera identifier, network communication with the at least one other video camera in the plurality of networked video cameras.

Implementations may include one or more of the following features, alone or in any combination. The system may include the plurality of networked video cameras, where: each video camera of the plurality of networked video cameras is configured with a network address; the at least one peer camera identifier may include the network address corresponding to that at least one other video camera; and initiating the network communication may include sending an alert message to the network addresses corresponding to each other video camera of the at least one other video camera. Responsive to the alert message, a second video camera of the at least one other video camera may be configured to: determine, based on the alert message, the network address for the first video camera and a timestamp corresponding to an object detection event by the second video camera; and send, to the first video camera, a set of peer metadata for the object detection event. The first video camera may be further configured to, responsive to the set of peer metadata for the object detection event: determine at least one video capture parameter from the set of peer metadata; modify, based on the at least one video capture parameter, video capture operations; and capture, using the modified video capture operations, additional video data. The first video camera may be further configured to: determine at least one object detection event corresponding to the object of interest detected by the first video camera; and send, to a second video camera of the at least one other video camera, at least one set of peer metadata for the at least one object detection event by the first video camera. The second video camera may be further configured to: determine at least one object detection event corresponding to the object of interest detected by the second video camera; and send, to the first video camera, at least one set of peer metadata for the at least one object detection event by the second video camera. The first video camera and the second video camera may be further configured to modify corresponding video capture operations to increase a likelihood of capturing the object of interest. The system may include the peer metadata datastore and the peer metadata datastore may include: a non-volatile memory configured to store metadata from the plurality of networked video cameras structured in a key-value memory architecture; and a processor configured to: receive metadata uploads from the plurality of networked video cameras; store metadata from the metadata uploads in the key-value memory architecture; process queries from the plurality of networked video cameras against the key-value memory architecture; and return, responsive to the queries, corresponding responses to the plurality of networked video cameras. A key of the key-value memory architecture may include a peer camera identifier and a network address corresponding to the peer camera identifier; and the corresponding responses may include at least the network address of a video camera of the networked video cameras corresponding to a set of metadata in that query matching a set of metadata in the key-value memory architecture. The key of the key-value memory architecture further may include at least one identifier corresponding to a hierarchical topology of the plurality of networked video cameras. A value of the key-value memory architecture may include a set of metadata corresponding to an object detection event by a video camera of the plurality of networked video cameras indicated by a corresponding key. The set of metadata may include: at least one gradient from a video frame corresponding to a detected object of interest in the video frame; a timestamp for the video frame; and at least one object tag corresponding to the detected object of interest. The system may include the controller circuit and the controller circuit may include: a processor; a memory; and an object detection model configured for execution by the processor using the memory. The object detection model may include a neural network: sized for the memory and processor using at least one process selected from: quantization; pruning; and model compression; and using pretrained parameters for the object of interest originating outside of the controller circuit.

Another general aspect includes a computer-implemented method that includes: detecting, by a first video camera and from video data captured by an image sensor of the first video camera, an object of interest, where: the first video camera is a video camera among a plurality of networked video cameras configured for communication over a network; and each video camera of the plurality of networked video cameras may include a non-volatile storage medium configured to store video data captured by an image sensor of that video camera. The method also includes determining, by the first video camera and based on the object of interest, a set of metadata corresponding to the object of interest; sending, by the first video camera to a peer metadata datastore over the network, a query may include selected metadata from the set of metadata; receiving, by the first video camera and responsive to the query, a peer camera identifier for a second video camera in the plurality of networked video cameras; and initiating, by the first video camera and responsive to receiving the peer camera identifier, network communication with the second video camera in the plurality of networked video cameras.

Implementations may include one or more of the following features, alone or in any combination. The computer-implemented method may include: determining, by the first video camera and based on the peer camera identifier, a network address for the second video camera; and sending, by the first video camera, an alert message to the network address corresponding to the second video camera, where each video camera of the plurality of networked video cameras is configured with: a corresponding network address for that video camera; and a corresponding peer camera identifier may include the corresponding network address for that video camera. The computer-implemented method may include, responsive to the alert message: determining, by the second video camera and based on the alert message, the network address for the first video camera and a timestamp corresponding to an object detection event of the second video camera; determining, by the second video camera and based on the timestamp, a set of peer metadata for the object detection event; and sending, by the second video camera to the first video camera, the set of peer metadata for the object detection event. The computer-implemented method may include, responsive to receiving the set of peer metadata for the object detection event: determining, by the first video camera, at least one video capture parameter from the set of peer metadata; modifying, by the first video camera and based on the at least one video capture parameter, video capture operations; and capturing, by the first video camera and using the modified video capture operations, additional video data. The computer-implemented method may include: determining, by the first video camera, at least one object detection event corresponding to the object of interest detected by the first video camera; sending, by the first video camera to the second video camera, at least one set of peer metadata for the at least one object detection event by the first video camera; determining, by the second video camera, at least one object detection event corresponding to the object of interest detected by the second video camera; sending, by the second video camera to the first video camera, at least one set of peer metadata for the at least one object detection event by the second video camera; modifying, by the first video camera and based on the at least one set of peer metadata for the at least one object detection event by the second video camera, corresponding video capture operations to increase a likelihood of capturing the object of interest at the first video camera; and modifying, by the second video camera and based on the at least one set of peer metadata for the at least one object detection event by the first video camera, corresponding video capture operations to increase a likelihood of capturing the object of interest at the second video camera. The computer-implemented method may include: receiving, by the peer metadata datastore, metadata uploads from the plurality of networked video cameras; storing, by the peer metadata datastore, metadata from the metadata uploads in a key-value memory architecture in a non-volatile memory of the peer metadata datastore; processing, by the peer metadata datastore, queries from the plurality of networked video cameras against the key-value memory architecture; and returning, by the peer metadata datastore and responsive to the queries, corresponding responses to the plurality of networked video cameras. The computer-implemented method may include comparing a set of metadata in a query to sets of metadata in the key-value memory architecture, where: a key of the key-value memory architecture may include a peer camera identifier and a network address corresponding to the peer camera identifier; and the corresponding responses may include the network address of a video camera of the networked video cameras corresponding to the set of metadata in that query matching a set of metadata in the key-value memory architecture having a key corresponding to that video camera. The key of the key-value memory architecture further may include at least one identifier corresponding to a hierarchical topology of the plurality of networked video cameras. A value of the key-value memory architecture may include a set of metadata corresponding to an object detection event by a video camera of the plurality of networked video cameras indicated by a corresponding key. The set of metadata may include: at least one gradient from a video frame corresponding to a detected object of interest in the video frame; a timestamp for the video frame; and at least one object tag corresponding to the detected object of interest.

Still another general aspect includes a system that includes a plurality of networked video cameras including a first video camera and a second video camera, where: the plurality of networked video cameras is configured for communication over a network; and each video camera of the plurality of networked video cameras may include a non-volatile storage medium configured to store video data captured by an image sensor of that video camera. The system also includes: means for detecting, by the first video camera and from the video data captured by the image sensor of the first video camera, an object of interest; means for determining, by the first video camera and based on the object of interest, a set of metadata corresponding to the object of interest; means for sending, by the first video camera to a peer metadata datastore over the network, a query may include selected metadata from the set of metadata; means for receiving, by the first video camera and responsive to the query, a peer camera identifier for a second video camera in the plurality of networked video cameras; and means for initiating, by the first video camera and responsive to receiving the peer camera identifier, network communication with the second video camera in the plurality of networked video cameras.

The various embodiments advantageously apply the teachings of computer-based surveillance systems to improve the functionality of such computer systems. The various embodiments include operations to overcome or at least reduce the issues previously encountered in surveillance systems and, accordingly, are more effective and/or cost-efficient than other surveillance systems. That is, the various embodiments disclosed herein include hardware and/or software with functionality to improve selective capture of surveillance video data by using metadata from other cameras identified through a query to a shared metadata datastore to coordinate video capture operations. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

BRIEF DESCRIPTION OF THE DRAWINGS

FIG. 5 is a flowchart of an example method of using a shared metadata datastore to initiate peer coordination for object detection.

FIG. 6 is a flowchart of an example method of coordinating with another video camera in response to an alert message from that video camera.

FIG. 7 is a flowchart of an example method of storing and processing object detection event metadata to support coordination by networked video cameras.

DETAILED DESCRIPTION

The present disclosure provides a peer-to-peer surveillance camera architecture that utilizes a shared metadata datastore. This architecture enables real-time coordination between networked cameras for improved video capture of objects of interest. In some embodiments, the surveillance camera architecture is decentralized, allowing each camera to operate independently without the need for a centralized control server. This approach can enhance the efficiency and effectiveness of surveillance systems, particularly in large and geographically distributed installations.

In some embodiments, the surveillance camera architecture includes a plurality of networked video cameras, each equipped with an image sensor for capturing video data and a non-volatile storage medium for storing the captured data. Each camera may also include a controller circuit configured to detect objects of interest from the video data, determine a set of metadata corresponding to the detected objects, and send queries comprising selected metadata to a shared peer metadata datastore over a network. The controller circuit of each camera may receive, in response to the metadata query, identifiers for other video cameras in the network that have captured similar metadata. The controller circuit may then initiate network communication with these identified cameras, enabling real-time coordination between the cameras, even where the video cameras had no prior knowledge of the other camera or its network address.

The shared peer metadata datastore may include a non-volatile memory configured to store metadata from the networked video cameras in a key-value memory architecture. The datastore may also include a processor configured to receive metadata uploads from the cameras, store the uploaded metadata in the key-value memory architecture, process metadata queries from the cameras against the key-value memory architecture, and return corresponding responses to the cameras.

In some embodiments, the surveillance camera architecture may utilize an object detection model, such as a neural network, to detect objects of interest from the video data. The object detection model may be sized for the memory and processor of the controller circuit using processes such as quantization, pruning, and model compression.

In some embodiments, the surveillance camera architecture may provide several advantages, including improved surveillance coverage, independence from a central server, enhanced data protection, and maintainability of data privacy. The architecture may also be easily expandable by adding new zones, clusters, and cameras without needing to notify existing cameras of the new additions or changes in topology. New keys and metadata for the new cameras may be added to the metadata datastore as those new cameras capture objects of interest and any camera in the network may learn of relevant cameras from a metadata query.

Figure 1:
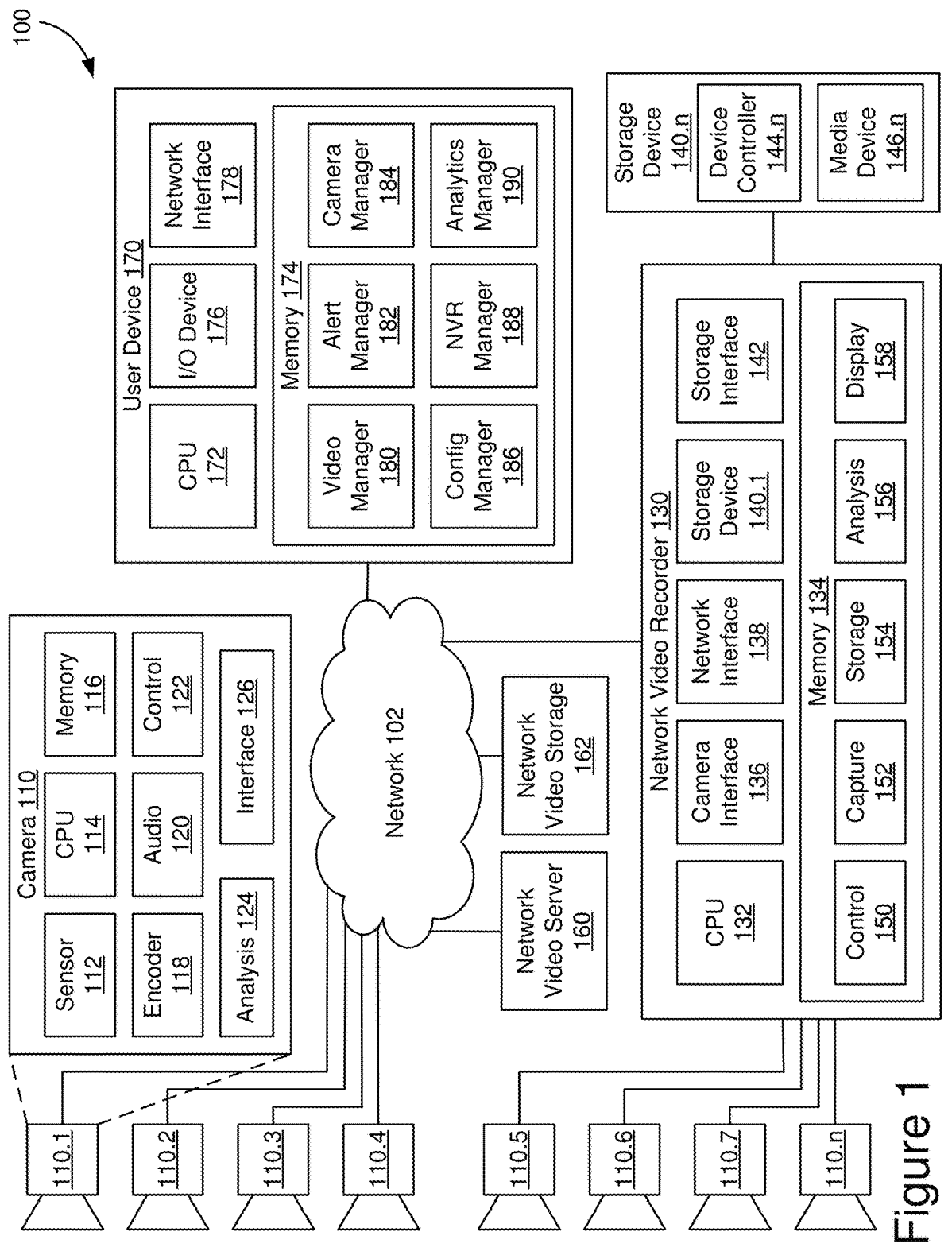
FIG. 1 schematically illustrates a computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.n in FIG. 1, without communicating through network 102. Similarly, in alternate embodiments (not shown), user device 170 may connect directly to network video recorder 130.

In some configurations, a large number of video cameras 110 (n in the 100s, 1000s, or more) may be interconnected in the same system. Each video camera 110 may be configured for autonomous operation for the capture and analysis of video data from its location. The video data shared with other components of video surveillance system 100 may be limited. For example, only video data including object detection events meeting certain criteria may be sent to network video recorder 130, network video server 160, or network video storage 162. In another example, object detection events determined by each camera may only generate an alert message with limited metadata regarding the event and that alert may be directed to network video recorder 130 or user device 170. In such a configuration, it may be up to a user of user device 170 to evaluate whether to access the video for the object detection event (such as by requesting playback from a video camera equipped with video server functions or initiating upload of the video of interest from the camera to the network video recorder or other component). Similarly, such selective sharing from video cameras 110 to other components may drive additional video analysis and/or automated responses. In some architectures, video cameras 110 may be organized hierarchically into different groups for management and/or connection to other components. For example, video cameras may be grouped in geographic and/or functional clusters, such as security cameras on a particular block or traffic cameras on a particular street. In some configurations, each cluster may have a corresponding network video recorder or other components configured for monitoring and managing video from the set of cameras in that cluster. These clusters may then be grouped into larger regions. For example, a neighborhood may be designated as a region and each of the clusters in that region may share other resources, such as network video server 160 or network video storage 162. Any number of layers may be included in such a hierarchy and other topologies are possible. The camera network may be defined in terms of shared network 102 and the ability of components in that network to communicate with other components. For example, a virtual private network configured using conventional internet protocols may enable video cameras to communicate with one another over an almost unlimited geographic area.

In some embodiments, one or more networks 102 may be used to communicatively interconnect various components of surveillance system 100. For example, each component, such as cameras 110, network video recorder 130, external storage device 140.n, network video server 160, network video storage 162, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream with a defined resolution, aspect ratio, and video encoding format. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones (not shown) and include embedded, synchronized, and/or independent audio streams with their respective video streams. In some embodiments, video cameras 110 may include an image sensor 112, a processor or central processing unit CPU 114, a memory 116, an encoder 118, an audio channel 120, a control circuit 122, and/or a network interface 126. In some embodiments, video cameras 110 may include onboard analytics, such as a video analysis subsystem 124. In some configurations, networked video cameras 110 may be configured in multiple groups, where each group is associated with a set of physical locations for a sub-region of the region being monitored. For example, video cameras 110.1-110.4 may be configured as a first group monitoring one sub-region while video cameras 110.5-110.n may be configured as a second group monitoring a different sub-region.

For example, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. In some embodiments, multiple image sensors are supported by the same circuit board and/or controller subsystem containing CPU 114, memory 116, encoder 118, audio channel 120, control circuit 122, analysis subsystem 124, and/or network interface 126.

Digital video data from image sensor 112 may be received by processor 114 for (temporary) storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Memory 116 may also include one or more storage devices, such as storage devices 140, configured for intermediate storage of video data and/or metadata in each camera. These storage devices may enable the camera to store video data as it is captured and include policies for preserving and overwriting preciously stored video data to manage the limited storage capacity. Encoder 118 may use various possible digital encoding and/or compression formats for encoding the video stream received by image sensor 112. In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats. In some configurations, the settings used by encoder 118 may be modified responsive to a video capture update message received by camera 110. Camera 110 may include audio channel 120 configured to capture audio data to be processed and encoded with image data in the resulting video stream and/or as an independent audio data stream.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130, another video camera 110, and/or user device 170 to configure video formats, enable and disable filters, set motion and/or audio detection, auto tracking, and similar features, and/or initiate video data streaming. In some embodiments, one or more systems may provide PTZ position control signals (and/or PTZ positioning commands converted to PTZ position control signals by control circuit 122) through the API. In some configurations, control circuit 122 may modify camera position or other features in response to a video capture update message received by camera 110.

In some embodiments, video camera 110 may include video analysis subsystem 124 configured for onboard video analytics. For example, video analysis subsystem 124 may be configured to use CPU 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries. In some embodiments, video analysis subsystem 124 may be configured to support object detection, classification, and/or recognition. For example, video analysis subsystem 124 may receive the real-time video data stream from sensor 112 and/or encoder 118, detect a video event, and instruct another camera to modify video capture operations prior to an object of interest entering the field of view of that other camera. In some configurations, the settings and reference data used by video analysis subsystem 124 may be modified responsive to a video capture update message received by camera 110.

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (PoE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured as a video storage device to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor or CPU 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.$n$. In some embodiments, camera interface 136 may include a PoE network switch for providing power to connected cameras and routing data packets to and from cameras 110.5-110.$n$, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD) or solid state drive (SSD). In some embodiments, storage device 140 is, or includes, a plurality of solid-state drives. In some embodiments, network video recorder 130 may include internal storage device 140.1 and expandable storage that enables additional storage devices 140.$n$ to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage device 140.$n$ may be of the same storage device type or a different storage device type.

In some embodiments, a respective data storage device 140 may include a single non-volatile storage medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (Re-RAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.$n$. In some embodiments, storage interface 142 may include a wireless data connection with sufficient bandwidth for video data transfer. Depending on the configuration and protocols used by storage interface 142, storage device 140.$n$ may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, user device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors or CPUs 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder manager 188 configured to provide a user interface for identifying, configuring, and managing network video recorder 130 and/or multiple network video recorders. Memory 174 may include an analytics manager 190 configured to provide a user interface for selecting, training, and managing event detection algorithms for surveillance system 100.

Figure 2:
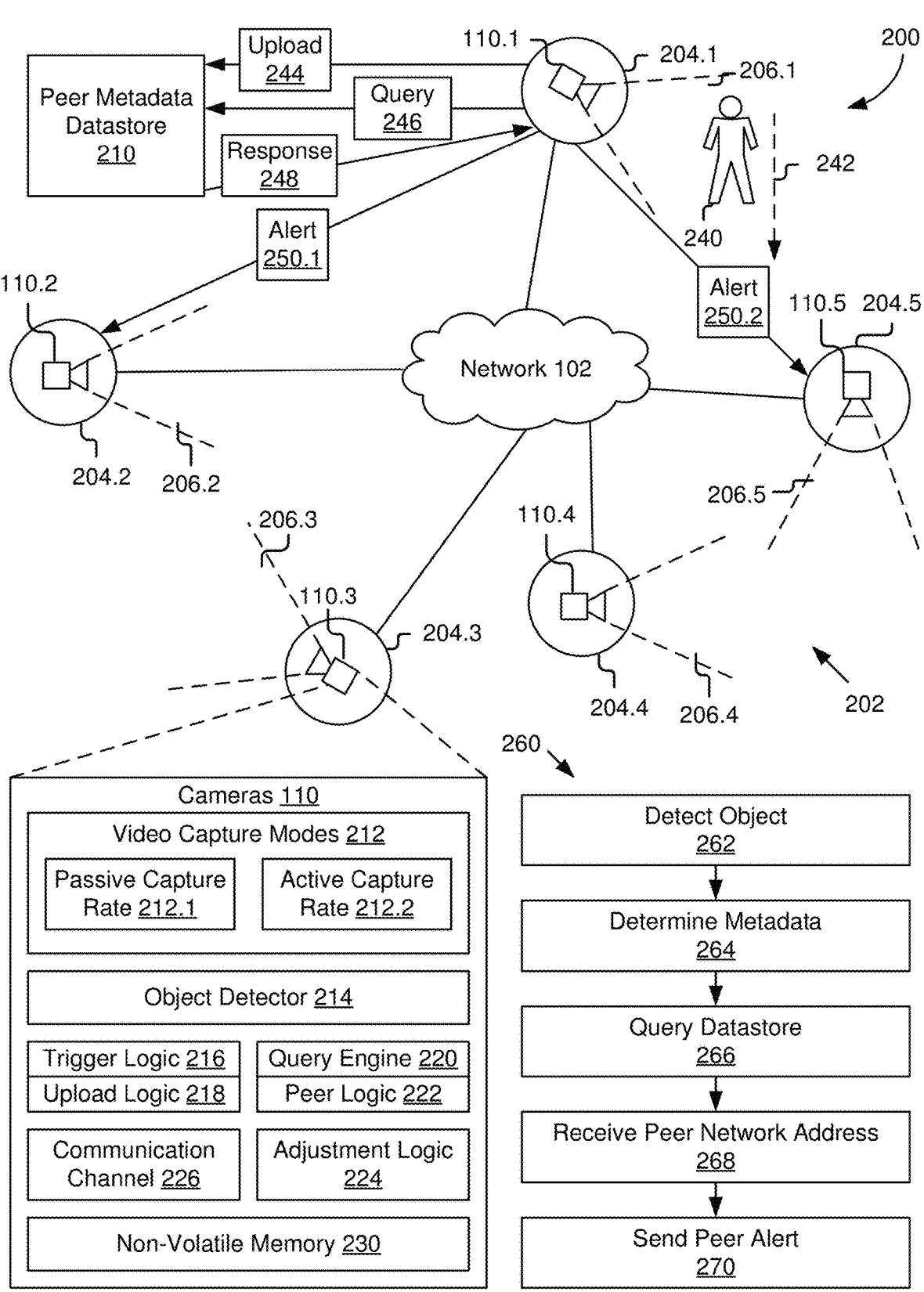
FIG. 2 schematically illustrates an example peer-to-peer surveillance camera architecture for multiple networked video cameras configured for using peer metadata datastore to initiate peer coordination, such as may be used by the computer-based surveillance system of FIG. 1.

FIG. 2 shows schematic representations of multiple networked video cameras configured for using predictive adjustment to modify video capture operations, implemented in a computer-based surveillance system 200, such as surveillance system 100 in FIG. 1. In the example configurations shown, cameras 110 are configured for onboard capture and analysis of video data. In camera environment 202, networked video cameras 110.1-110.5 are located around plurality of locations, such as different installation points in a city park, shopping center, or city block. In one example configuration, each camera 110 may be placed on the exterior of a building or mounted to a municipal service pole or similar structure to provide video capture in the vicinity of the building, entry, intersection, or other point of interest. Upon installation, cameras 110 have known node locations 204 with known spatial relationships to one another and defined fields of view 206. For example, a generally overhead view of camera environment 202 may allow cameras 110 and other relevant attributes of camera environment 202 to be mapped using a coordinate position system. Coordinate position systems may include two-dimensional mapping based on longitude and latitude or another X-Y coordinate system and scale applied to camera environment 202. In some configurations, a three-dimensional mapping may be used, such as adding elevation, altitude, or a similar Z coordinate to the two-dimensional coordinate position system. Fields of view 206 may be defined in terms of two or more bounding vectors and may include default position and maximum ranges in each direction of adjustment if equipped with PTZ actuators.

Cameras 110 may be deployed to monitor their respective fields of view 206 for object detection and related object detection event handling, such as alerts, selective archival storage, etc. For example, cameras 110 may be placed in their respective surveillance locations to detect object of interest 240 (in this case, a person) when it moves into their respective fields of view 206 along path of movement 242. Other example objects of interest may include vehicles, animals, equipment, etc. Path of movement 242 may indicate an event direction from the camera that has most recently captured the object of interest (e.g., camera 110.1). In response to object of interest 240, it may be beneficial to modify the operation of other cameras in the network to increase the likelihood of capturing additional video data for the object of interest.

In some configurations, cameras 110 may be configured for video capture modes 212 based on different video capture rates. For example, cameras 110 may include a passive video capture rate 212.1 that includes lower quality video (e.g., lower pixel count and/or frame rate) to save storage space and/or network bandwidth for operating periods when no objects of interest are likely to be present in the field of view. Cameras 110 may include an active video capture rate 212.2 that includes higher quality video (e.g., higher pixel count and/or frame rate) to provide better video data for analysis, display, and/or storage of possible object detection events. Additionally, cameras may have other video capture parameters (e.g., low-light or filter modes) and/or object detection parameters, including selective allocation of processing resources to object detectors configured for different object types. For PTZ enabled cameras, positioning may also be proactively changes to move the fields of view to more likely positions to capture the object of interest.

Once camera 110.1 has detected object of interest 240, it may be advantageous to predictively and selectively adjust the video capture operations of the other cameras. While it may be possible to alert all cameras to modify their video capture operations, doing so every time any of the cameras detected an object of interest would result in a waste of storage, network bandwidth, and other resources—particularly as the network of video cameras grows larger. In some configurations, competition for constrained resources in the system, such as limited network bandwidth and/or storage channels, may prevent all cameras from operating at active capture rate 212.2 at the same time and/or for extended periods. Similarly, prioritizing specific object detectors and/or changing object model configurations to increase the likelihood of detecting the particular object of interest may also be advantageous for selected cameras in the network. If camera 110.5 modifies its video capture operations, such as by switching to its active capture rate, pivoting to its right facing actuator position, prioritizing the object detector for the object type of the object of interest, and other changes of video capture operating parameters, before object of interest 240 enters field of view 206.5, it may maximize the chances of capturing high-quality images of the object to support further detection, recognition, monitoring, or other analysis.

Cameras 110 may have been deployed with object detectors 214 configured to detect objects of interest using video data captured at their passive capture rate 212.1 and/or active capture rate 212.2. For example, object detectors 214 may be trained on low-quality video to detect one or more objects of interest at a relatively low confidence threshold to trigger active capture rate 212.2 and processing of additional video data at the higher quality and with an object detector trained on higher quality data to confirm object detection, enable classification and/or object recognition, or support other analysis. Alternately, other sensors, such as motion sensors, audio sensors, etc. or detection algorithms, such as video tripwires, etc., may be used to initially trigger active capture rate 212.2 for a camera when an object of interest initially enters camera environment 202. In some configurations, additional processing of the high-quality video data by object detector 214 may include classification of the object type and/or determination of a direction of travel for the object of interest and may return corresponding object tags describing one or more object types or other features.

Cameras 110 may include trigger logic 216 for determining an object detection event that triggers upload of object detection event data and/or querying peer metadata datastore 210 to find other video cameras for coordination. For example, trigger logic 216 may be based on one or more parameters of the detected object, object type, and/or associated confidence values from object detection/classification models. In some configurations, objects of specific types, such as people, vehicles, or animals, may be a trigger condition and a direction of motion that will take the object out of the current camera's field of view may be another trigger condition. If the trigger conditions are met, trigger logic 216 may initiate upload logic 218 and/or query engine 220 to interact with peer metadata datastore 210. For example, upload logic 218 may include functions for determining a relevant set of metadata for populating the metadata values of a object detection event entry in peer metadata datastore 210 and messaging protocols for sending upload message 244 to peer metadata datastore 210. Query engine 220 may include functions for determining, based on the relevant set of metadata, the set of metadata parameters to use for a query of peer metadata datastore 210 and messaging protocols for sending query message 246 to peer metadata datastore 210.

Cameras 110 may include peer logic for receiving and handling a response message 248 from peer metadata datastore 210 indicating one or more peer camera identifiers for other video cameras that have uploaded similar events to peer metadata datastore 210. For example, peer logic 222 may include functions for determining a network address for the peer video camera from response message 248 and initiating peer-to-peer communication with that video camera. In some configurations, peer logic 222 may generate a peer camera alert message to both alert the other camera of a similar object detection event (in relative real-time, subject to messaging delays) and initiate coordination between the cameras. For example, response 248 may indicate peer camera identifiers and corresponding network addresses for both video camera 110.2 and 110.5 and peer logic 222 may generate peer camera alert messages 250.1 and 250.2 and send those alerts using appropriate messaging protocols and the network addresses. Once coordination is initiated by alert messages 250.1 and 250.2, peer logic 222 may include additional functions for exchanging object detection event parameters, such as object detection parameters and video capture parameters, that the cameras may use to modify operations. For example, peer logic 222 may include alert response handler functions for parsing received alert messages, determining relevant object detection event metadata within the camera metadata, sharing relevant metadata back to the camera that sent the alert, and/or initiating adjustments to video capture operations using adjustment logic 224. Peer coordination logic within peer logic 222 may include functions and messaging for sharing metadata between the two cameras in real-time to make adjustments to video capture operations by adjusting video capture parameters and/or object detector parameters to increase a likelihood of one or both cameras capturing additional video data of the object of interest that initiated the object detection event.

FIG. 2 schematically illustrates an example method 260 for using a video camera and shared metadata datastore to initiate peer coordination for object detection. The method 260 may be executed by one or more video cameras in a surveillance system, such as video cameras 110 in surveillance system 200. The method 260 may enable a video camera to identify and communicate with other video cameras that have detected similar objects of interest. By executing method 260, a video camera may coordinate its video capture operations with peer cameras to improve surveillance coverage of objects of interest.

At block 262, an object of interest may be detected from video data captured by a video camera. For example, the object detector 214 of video camera 110.1 may analyze video frames to identify a person entering the camera's field of view 206.1.

At block 264, a set of metadata corresponding to the object of interest may be determined. For example, the video camera 110.1 may extract features from the detected object, such as gradients, color histograms, or bounding box coordinates, and combine them with a timestamp and object classification tags to form the metadata set.

At block 266, a query comprising selected metadata from the set of metadata may be sent to a peer metadata datastore. For example, the query engine 220 of video camera 110.1 may construct a query message 246 containing key object features and send it to the peer metadata datastore 210 over the network 102.

At block 268, a peer camera identifier for at least one other video camera may be received in response to the query. For example, the peer metadata datastore 210 may process the query against its stored metadata and return a response message 248 to video camera 110.1 containing network addresses for video cameras 110.2 and 110.5 that have recently uploaded similar object metadata.

At block 270, network communication may be initiated with the at least one other video camera using the peer camera identifier. For example, the peer logic 222 of video camera 110.1 may use the received network addresses to send alert messages 250.1 and 250.2 to video cameras 110.2 and 110.5, initiating peer-to-peer coordination for tracking the object of interest.

Cameras 110 may include adjustment logic 224 configured to use metadata received from other video cameras to proactively and predictively adjust video capture operating parameters based on such metadata. For example, adjustment logic 224 may receive and parse the metadata from another camera in an alert message or subsequent metadata sharing message to determine video capture parameters and/or object detector parameters to modify. In some configurations, a set of video capture operating parameters based on the object type, features or gradients corresponding to the object of interest, camera positioning, and/or other parameters to assist in modifying the video capture of the camera may be determined based on the received metadata. Adjustment logic 224 may use the modified parameters to initiate changes in the operation of camera actuators, encoders, analysis, and/or storage functions in response to the metadata. In some configurations, adjustment logic 224 in a receiving camera may also be configured to recognize when that camera is already engaged in high-priority video capture (such as due to a different object of interest or event) and may reject to make adjustments during coordination that would negatively impact the current video capture operations. Adjustment logic 224 may also include a time period during which adjustments are applied and return the video camera to normal video capture operations when that time period has expired.

Cameras 110 may include a communication channel 226 for sending one or more messages, such as messages to peer metadata datastore 210 or alert messages to peer video cameras to initiate metadata exchange or other coordination, to other cameras. For example, cameras 110 may use a network address determined from a response message from peer metadata datastore 210 for cameras with matching object detection events and include a messaging protocol to address an alert message to that network address. In some configurations, cameras 110 may be internet protocol (IP) cameras on a common network and communication channel 226 may be configured for peer-to-peer communications through a network interface. In some configurations, cameras 110 may include a network or direct connection to a host and communication channel 226 may be configured to use the host as a gateway or router for sending messages to other video cameras.

Cameras 110 may include non-volatile memory 230 configured to store video data captured by that video camera. For example, cameras 110 may each include a data storage device, such as a flash card or solid-state disk drive, configured to store video data to a non-volatile storage medium for a limited period of time based on a retention cycle for surveillance video data. As described above, on-camera memory may include a limited capacity and cameras 110 may send video data through communication channel 226 to be stored in other memory systems, which may include the memory of other cameras, a host, and/or video storage accessible through the host. In some configurations, modification of video capture operating parameters may include increasing the quality of captured video (in terms of both sample rate and encoding) and a commensurate increase in the amount of storage capacity used to store such video.

Peer metadata datastore 210 may be hosted in a datastore server to provide selective metadata storage for object detection events and related query processing to video cameras 110. An example datastore server 402 is further described below with regard to FIG. 4. Example video camera configurations are further described below with regard to video camera 300 in FIG. 3.

Figure 3:
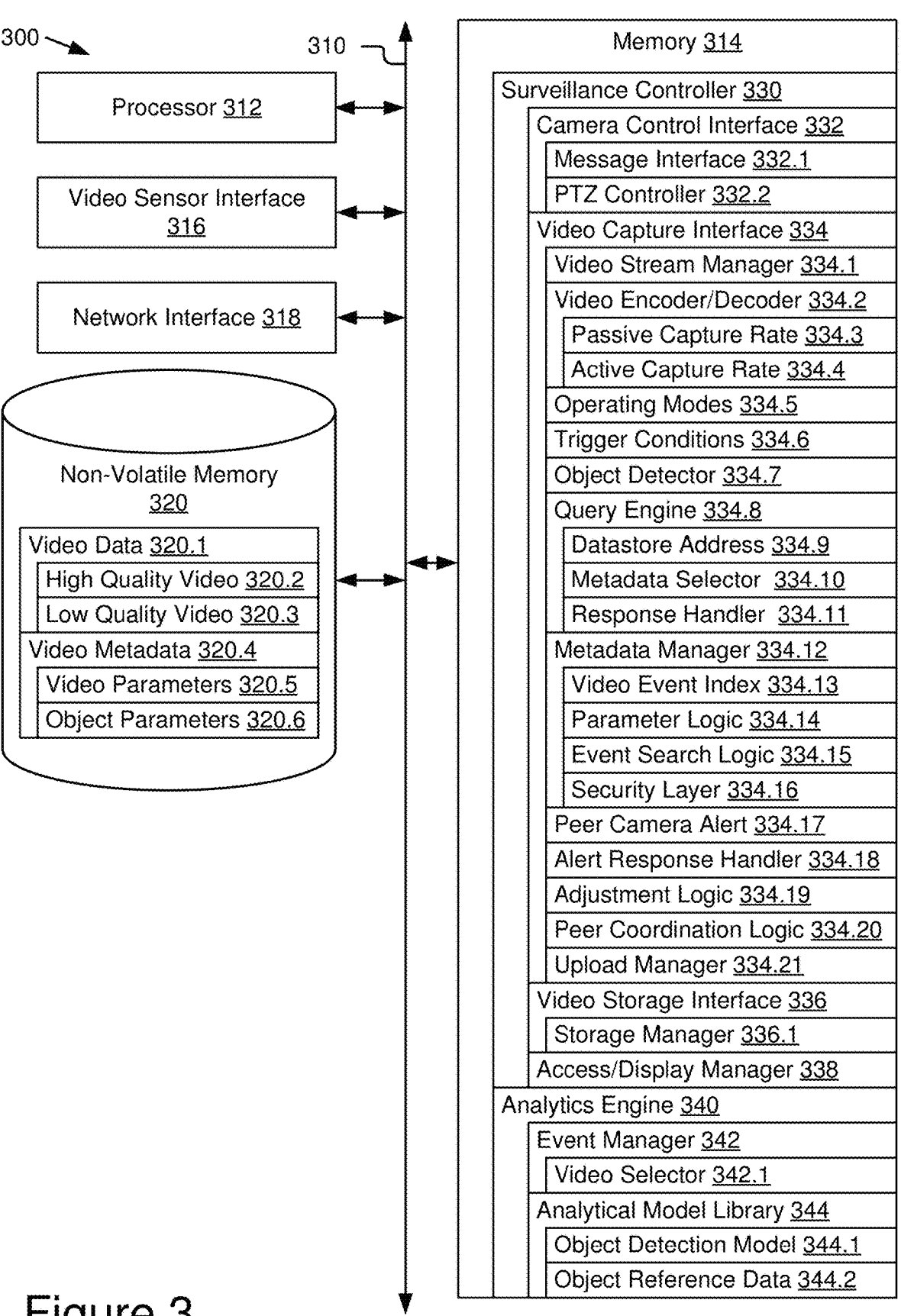
FIG. 3 schematically illustrates some elements of a video camera in computer-based surveillance system of FIG. 1.

FIG. 3 schematically shows selected modules of a video camera 300 configured for predictively modifying the video capture operations among peer video cameras based on metadata sharing using a peer metadata datastore. Video camera 300 may incorporate elements and configurations similar to those shown in FIGS. 1-2. A video camera and its embedded or attached compute resources may be configured with the functions of surveillance controller 330. For example, bus 310, processor 312, memory 314, video sensor interface 316, network interface 318, and/or non-volatile memory 320 may be integrated in a controller circuit that forms at least a portion of the onboard electronics of the video camera. In some configurations, the controller circuit may include a storage interface to a non-volatile storage device embodying non-volatile memory 320, such as a flash card or solid-state drive.

Video camera 300 and/or any component thereof may include a bus 310 interconnecting at least one processor 312, at least one memory 314, and at least one interface, such as video sensor interface 316 and network interface 318. Bus 310 may include one or more conductors that permit communication among the components of video camera 300. Processor 312 may include any type of processor or microprocessor that interprets and executes instructions or operations. Processor 312 may include a plurality of processors or processor cores configured to operate alone or in combination to execute functions or modules stored in memory 314. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element.

Video sensor interface 316 may be configured for connection with one or more video sensors. For example, video sensor interface 316 may include a bus connection to an image sensor and related subsystem for capturing video data as directed by video capture interface 334. In some configurations, video sensor interface 316 may connect to or otherwise integrate with an image sensor configured substantially as described above for sensor 112 in FIG. 1.

Network interface 318 may include one or more wired or wireless network connections to network, similar to network 102. Network interface 318 may include a physical interface, such as an ethernet port, and related hardware and software protocols for communication over the network, such as a network interface card or wireless adapter. Network interface 318 may be configured with a corresponding network address for receiving network messages from other components of the surveillance system.

Video camera 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by video camera 300.

Video camera 300 may include a plurality of modules or subsystems that are stored and/or instantiated in memory 314 for execution by processor 312 as instructions or operations. For example, memory 314 may include a surveillance controller 330 configured to control operation of video camera 300 to capture and store video streams from the camera image sensor, as well as selectively coordinate with peer video cameras to modify video capture operations. Memory 314 may include an analytics engine configured to analyze video data to detect events for use by surveillance controller 330, such as supporting operation of one or more object detectors, such as object detector 334.7.

Surveillance controller 330 may include interface protocols, functions, parameters, and data structures for controlling various components of video camera 300 to capture, analyze, and store video data from the camera's video sensors, as well as interfacing with analytics engine 340. For example, surveillance controller 330 may be an embedded firmware application and corresponding hardware in a controller circuit for video camera 300. In some configurations, a group of networked video cameras may be configured to use onboard memory and processors for camera control and video capture, including generation and response to alerts or notifications to update video capture operations, and may include some amount of onboard video storage. In such configurations, the group of networked video cameras may be configured to selectively interface with a remote surveillance manager and/or surveillance application operating on control center or end user computer systems, which may include the functions of a network video recorder, network video server, and/or network video storage. Direct control of video cameras by these centralized systems for real-time video monitoring and coordination among video cameras may not be necessary. Surveillance controller 330 may be configured to communicate with a peer metadata datastore to assist with identifying relevant video cameras for coordination among networked video cameras and without any specific knowledge of the relevant video cameras prior to receiving an indication of relevance and associated communication parameters from a query to the peer metadata datastore.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a video storage interface 336, and an access and display manager 338.

Camera control interface 332 may include interface protocols and a set of functions, parameters, and data structures for using, configuring, communicating with, and providing command messages to various camera components or subsystem. For example, camera control interface 332 may include an API and command set for interacting with control circuits to access one or more camera functions. In some embodiments, camera control interface 332 may be configured to set video configuration parameters for camera image sensors, microphones, and/or video encoders, access motor controllers for pan-tilt-zoom features, control filters or lenses, and/or otherwise manage operations or subsystems of the camera outside of main controller electronics. For example, camera control interface 332 may maintain a video camera configuration table, pages, or similar data structures that includes entries each subcomponent or subsystem and its relevant settings, as well as a message interface, such as a bus protocol, for communicating with those components. In some configurations, video sensor interface 316, network interface 318, and a storage interface for non-volatile memory 320 may be integrated or interface directly with video capture interface 354, video storage interface 336, and/or access/display manager 338.

In some embodiments, camera control interface 332 may include a message interface 332.1 for sending and/or receiving messages with other components in a networked surveillance system. For example, message interface 332.1 may include a messaging protocol for sending or exchanging messages with peer video cameras and/or other system resources, such as a datastore server, network video recorder, or central control system. In some configurations, message interface 332.1 may use internet protocol, master-slave, and/or multi-master messaging over network interface 318 to send messages to selected cameras or other systems. In some configurations, application-level messaging may be used to send, parse, and respond to messages and enable the camera to determine metadata, parameter changes, or control commands from the message content to initiate changes in video capture operations. In some configurations, message interface 332.1 may be integrated in or responsive to video capture interface 334 to enable surveillance controller 330 to respond to video events by sending metadata uploads and queries to the metadata server. In some configurations, message interface 332.1 may include a peer-to-peer message interface among video cameras in the networked group to enable direct communication among the video cameras for alerts and metadata exchange messages based on corresponding network addresses for those video cameras.

In some embodiments, camera control interface 332 may include a PTZ controller 332.2 for video camera 300. For example, video camera 300 may be equipped with a PTZ control unit and associated motor and/or digital controllers and command interface for moving that video camera from its current position to pan, zoom, and/or tilt to change the field of view. In some embodiments, PTZ controller 332.2 may send PTZ control commands to adjust camera position and/or zoom in real-time, such as responsive to the detection of an object of interest in the field of view (but not ideally positioned in the field of view). In some embodiments, PTZ controller 332.2 may include a set of configuration settings for auto-tracking or auto-capture functions. For example, cameras may include an auto-capture feature for detecting objects of interest and then centering and zooming on the detected object. PTZ controller 332.2 may be used to configure the parameters of the auto-capture feature, such as classes of objects (e.g., humans, human faces, vehicles, license plates, etc.) to be captured, PTZ ranges or limits, timing, quality or reliability thresholds, etc. In some embodiments, PTZ controller 332.2 may use and/or generate a set of video capture parameters related to the positioning and zoom for a particular field of view during specific video capture operations. For example, responsive to a video event for an object of interest, PTZ parameters representing the position of the camera during that video capture may be stored as metadata and stored in video parameters 320.5 related to a timestamp and/or object detection event.

Video capture interface 334 may include camera interface protocols and a set of functions, parameters, and data structures for receiving and processing video data streams captured by the video image sensor. For example, video capture interface 334 may include video data channels and related data buffers for managing the video data stream. Video capture interface 334 may generate video metadata related to the video capture parameters used for generating the video data, such as frame rate, aspect, pixel count, etc., as well as a timestamp corresponding to when each frame is captured and other physical parameters, such as PTZ settings, filter, optical zoom, etc. In some embodiments, video capture interface 334 may support an audio channel or audio track for audio data synchronized to the captured video data. For example, one or more video formats supported may include one or more audio channels for audio data from one or more microphones associated with the video camera.

Video capture interface 334 may include a video stream manager 334.1 configured to identify and manage the video stream generated by the camera. For example, video stream manager 334.1 may manage video buffer allocation and space, processing of the raw video stream through video encoder/decoder 334.2 and object detector 334.7, and flushing of buffered video to storage through video storage interface 336. The metadata generated or identified by video stream manager 334.1 may be stored in video metadata 320.4 as the video data is captured. For example, video stream manager 334.1 may write video capture parameters 320.5 in a time-indexed log that identifies the various parameter values used during the video capture operation, such as image/video format, physical configuration parameters (PTZ et al.), and encoder settings. In some configurations, the set of video capture parameters for any given frame of video data may be determined using a timestamp to index video metadata 320.4.

Video stream manager 334.1 may be configured to use encoder/decoder 334.2 to encode the camera video stream in a desired video format. In some embodiments, encoder/decoder 334.2 may be configured to receive the raw video data stream from the image sensor and determine the video data format to be used, including a capture rate of the raw data from the image sensor. For example, the video capture rate may include a number of pixels or resolution of the image data from the image sensor and a frame rate determining how frequently the pixel values are determined. In some embodiments, encoder/decoder 334.2 may support two or more selectable video capture rates and corresponding video formats. For example, encoder/decoder 334.2 may support a passive video capture rate 334.3 and an active video capture rate 334.4. Passive video capture rate 334.3 may have a lower rate than active video capture rate 334.4 such that passive video capture rate 334.3 captures less video data (e.g., low quality video 320.3) and requires less processing, network bandwidth, and/or data storage, but with lower video quality that may be less effective for display and/or analytics. Active video capture rate 334.4 may capture more video data with higher video quality (e.g., high quality video 320.3) for display and analytics, but at the cost of increased processor use, network bandwidth, and/or data storage. In some embodiments, video encoder/decoder 334.2 may support more than two selectable video capture rates. In some embodiments, in-camera video encoders may encode video data from the image sensor in a first (camera) video format and video stream manager 334.1 may use encoder/decoder 334.2 to re-encode them in one or more other formats. For example, video stream manager 334.1 may use encoder/decoder 334.2 to change the resolution, image size, frame rate, codec, compression factor, color/gray-scale, or other video format parameters. These parameters may also be stored as video capture parameters 320.5 in video metadata 320.4.

In some embodiments, video capture interface 334 may include a plurality of operating modes 334.5. For example, a standby operating mode may include a low power state in which the video camera is not actively capturing video and a normal operating mode may include a normal power state where the video camera may activate any of its resources, including capturing video using its image sensor and processor. In some embodiments, operating modes 334.5 may include low light operating modes for low light conditions, motion/tripwire-only modes where only low-level processing of image sensor data (or a separate motion sensor) is active without video capture, and other operating modes. In some embodiments, one or more operating modes may be associated with specific video capture rates and encoding formats. For example, a passive video capture mode may use passive video capture rate 334.3 and an active video capture mode may use active video capture rate 334.4. Video cameras may use different operating modes during different operating periods and operating modes may be used to modify one or more video capture operations. For example, each operating mode may define whether or not video capture is suspended or operating and, if operating, what set of video capture parameters are being used, such as video capture rate (resolution and frame rate), encoding codec, filters, etc.

In some embodiments, video capture interface 334 may include trigger conditions 334.6 for moving between operating modes 334.5. For example, video capture interface 334 may have a default operating mode and one or more other operating modes that are triggered when specific conditions are met. For example, a camera may be configured to default to normal operating mode but change to low-light operating mode when light levels drop below a threshold. In some configurations, a camera may include passive video capture mode as a default mode for continuous video surveillance, due to the lower resource usage, and include one or more triggers conditions 334.6 for changing the operating mode. For example, when motion, a video tripwire, or an object are detected from the passive video data, the video capture interface 334 may change the operating mode to the active video capture mode for the camera that detected the condition. However, these video-based triggers may be less reliable using passive video data and there may be a lag between an object entering the field of view and successfully triggering a video condition, including the required processing time for the monitoring analytics. In some embodiments, video capture interface 334 may include one or more trigger conditions 334.6 based on predictively changing operating modes based on video events occurring at other video cameras. For example, video capture interface 334 may include an alert response handler 334.18 and/or peer coordination logic 334.20 that may include trigger conditions for changing operating modes based on metadata received from another video camera. In some configurations, trigger conditions 334.6 may include conditions for selecting among one or more object detectors, such as object detector 334.7, for processing captured video data in real-time. For example, responsive to detected motion or a video tripwire, trigger conditions 334.6 may initiate object detector 334.7 to process the video data looking for a particular object type. In some configurations, trigger conditions 334.5 may map conditions to different object detectors, object detector parameters, and/or object detector priorities.

Object detector 334.7 may include or access one or more analytical models to support detection of one or more objects of interest with corresponding object types. Object detector 334.7 include a machine learning model trained to detect one or more object classes, such as people, animals, motor vehicles, etc. For example, object detector 334.7 may operate on captured video data received from a video camera to detect whether an object of interest is present in the video data. In some embodiments, object detector 334.7 may include a lightweight object detection model that can be processed in near real-time with the limited processing bandwidth of the video camera and/or associated compute resources. For example, object detector 334.7 may be configured using a TinyML compliant machine learning model deployment. Object detector 334.7 may include a model size and complexity matched to the available operating speed of processor 312, specially allocated memory space in memory 314, and/or specialized hardware in video camera 300. For example, one or more neural network object classifiers may be trained using training data on another machine learning training system and sized for memory 314 and processor 312 using at least one process selected from quantization, pruning, or model compression. Object detector 334.7 may incorporate the lightweight neural network model using pretrained parameters for the object of interest that were generated on the machine learning training system and deployed to video camera 300 rather than originating from the limited processing resources of video camera 300. In some embodiments, the object detection model may operate on the video data in the video stream and return a flag or class for the object type detected, an object quality of confidence metric, object position, and/or object boundary data, such as two horizontal positions and two vertical positions to define a boundary box within the video frame. Additional features, vectors, or gradients of the detected object may also be returned by object detector 334.7. These object parameters may be stored in video metadata 320.4 as object parameters 320.6 associated (by timestamp) with specific video frames and/or object detection events. In some embodiments, object detector 334.7 may have one or more associated object confidence thresholds for evaluating the object confidence value for each object detection event. For example, object detector 334.7 may include an object detection threshold, below which the presence of an object is not treated as sufficiently certain to raise an object detection event, such as 50% reliability. In some embodiments, object detector 334.7 may be used to identify object detection events and raise corresponding notification to one or more other components of video capture interface 334, such as query engine 334.8 and metadata manager 334.12.

Query engine 334.8 may include logic for receiving notification of a object detection event and selectively initiating a process for coordinating with other video cameras. For example, responsive to an object detection event meeting a peer alert confidence threshold or complying with a set of object and/or video parameter criteria for high priority objects of interest, query engine 334.8 may generate and send a query to a peer metadata datastore to determine whether other video cameras should be alerted to initiate peer coordination. Query engine 334.8 may be configured with a datastore network address 334.9 to support messaging with a shared peer metadata datastore that collects metadata for object detection events across the population of networked video cameras. Query engine 334.8 may include metadata selector logic 334.10 configured to select a set of metadata values based on the object detection event to query the peer metadata datastore for similar object detection events by other video cameras. For example, metadata selector logic 334.10 may select among feature or gradient values, object tags, and timing parameters (such as a global timestamp window) for a query parameter set to search for among the metadata values stored in the metadata datastore. Query engine 334.8 may generate and send a query message including the query parameter set using message interface 332.1, network interface 318, and query language or protocol supported by the metadata datastore. Query engine 334.8 may also include a response handler 334.11 for receiving the query response from the metadata datastore. For example, the metadata datastore may return a query response that includes a null set if no corresponding entries are found or one or more object detection event records or entries from the datastore if matches to the search criteria are found. In some configurations, the metadata datastore returns a key-value pair for each object detection event meeting the query parameters, where the key identifies the peer video camera and provides a network address for initiating peer-to-peer communication with that camera and the value corresponds to the object detection event metadata stored in the metadata datastore for that object detection event. Response handler 334.11 may parse the query response message and pass the information received for any corresponding events to peer camera alert 334.17.

Metadata manager 334.12 may include logic for managing video metadata 320.4 stored locally in video camera 300. For example, metadata manager 334.12 may receive video parameters from video stream manager 334.1 as video is captured and stored through video storage interface 336 and may receive object parameters from object detector 334.7 when object detection events occur. Metadata manager 334.12 may be configured to organize historical object detection events detected by object detector 334.7 and may include object detection events corresponding to video data currently stored in video data 320.1 and/or object detection events that have not been retained in local video storage (due to expiration and recycling of video storage space and/or offload to other surveillance system components, such as network video storage or a network video recorder. Metadata manager 334.12 may use a video event index 334.13 to store object parameters for the video events in video metadata 320.4. For example, video event index 334.13 may include entries for each object detection event and corresponding timestamps for the timing and duration of the event and corresponding object parameters. Parameter logic 334.13 may include the logic used by metadata manager 334.12 to select object parameters to be stored in video event index entries for each object detection event. For example, video event index 334.13 may include a data structure with fields mapped to parameters or parameter categories and accepting defined sets of object parameter values for different types of object detection events. Parameter logic 334.13 may be used to select and store video parameters 320.5 and/or object parameters 320.6 in video metadata 320.4. Event search logic 334.15 may include logic for querying or searching video metadata 320.4 to return specific video and/or object detection event parameters of interest for use by other operations, such as query engine 334.8 and peer coordination logic 334.20. In some configurations, metadata manager 334.12 may include a security layer 334.16 for determining whether metadata may be returned or used for a particular purpose. For example, security layer 334.16 may provide open access to video metadata 320.4 for internal operations of video capture interface 334, but may require credentials or verification for metadata requests to be returned to peer storage devices or another system. Security layer 334.16 may be configurable by video metadata criteria to determine metadata that may be shared with peer video cameras.

Peer camera alert 334.17 may include logic for generating peer alert messages in response to other video cameras with similar object detection events being received by query engine 334.8. For example, peer camera alert 334.17 may receive one or more key-values corresponding to similar events detected by other cameras for a recent or ongoing object detection event by video camera 300. Peer camera alert 334.17 may parse the key to determine the peer video camera and the network address for messaging that camera. Peer camera alert 334.17 may then generate an alert message addressed to the network address and containing an object detection event notification to the peer video camera that identifies video camera 300 as having a similar event and may include timestamp and/or other metadata for the local event in addition to metadata returned from the query, such as timestamp and object type, to assist the peer camera in determining which of their object detection events has triggered the peer camera alert. The peer alert message may also include the camera identifier and network address of video camera 300 to establish mutual communication and possible peer-to-peer data exchange to support coordinated response to the object detection event.

Alert response handler 334.18 may include logic for receiving a peer alert message from another video camera and determining whether and how to respond. For example, alert response handler 334.18 may be configured to receive unsolicited alert messages from any networked video camera and determine the peer video camera that sent the message and the object detection event to which it relates. In some configurations, alert response handler 334.18 may use the metadata parameters for one or more object detection events to query their own video metadata for additional metadata related to the historic event and/or additional related events. For example, alert response handler may use the object tag and timestamp to search video event index 334.13 to find the historic object detection event and additional object parameters and video parameters stored locally and not shared with the peer metadata datastore. In some configurations, the object parameters and/or video parameters, particularly video capture parameters and object detector parameters that enabled the prior object detection may be provided to adjustment logic 334.19 to adjust the video capture parameters for video capture operations to increase the likelihood of detecting the object of interest.

In some embodiments, adjustment logic 334.19 may include logical rules for applying object detection events and their corresponding video capture parameters and object detection parameters to modifying video capture operations, including configuration and priority of object detector 334.7. For example, adjustment logic 334.19 may include a set of threshold values and logical rules for applying those threshold values to triggering modification of the video capture operations. In some configurations, adjustment logic 334.19 may include a set of active capture thresholds for initiating active video capture rate 334.4 and/or a corresponding active video capture mode. In some configurations, adjustment logic 334.19 may use more specific metadata parameters from a peer video camera or from historical object detection events indicated in a peer camera alert to modify video capture operations. For example, adjustment logic 334.19 may select positioning parameters, filter parameters, timing parameters, encoding parameters, or other video capture parameters to modify the current video capture operations to align them with prior successful detection of the object or object type of interest. Similarly, object detector parameters, such as processing priority for the object type and corresponding object detector, reference gradients or features, classification thresholds, or other object detector parameters, may be modified to increase the likelihood of detecting the object of interest in the video data stream if and when it enters the field of view of the video camera. In some configurations, responsive to peer coordination logic 334.20, peer video cameras may use adjustment logic 334.19 to make iterative adjustments based on corresponding and ongoing object detection events and multiple instances of sharing related object detection event metadata between the two cameras. In some configurations, adjustment logic 334.19 may also include a timing function for tracking and limiting the amount of time that video capture parameters are modified by an object detection event from another video camera. For example, based on a priority of the object type or object detection event, adjustment logic 334.19 may assign a time window during which the modified video capture operations will be used. When the time window expires, video capture operations will return to their normal or default state, such as their passive capture mode.

In some configurations, threshold values used by adjustment logic 334.19 may include confidence thresholds for the object detection or classification. For example, metadata for object detection events may include an object type, type confidence value, direction of motion value, and motion confidence value. If the object type matches an object of interest type, the type confidence value meets a type confidence threshold (e.g., 50%), and the direction of motion value meets the motion confidence threshold (e.g., 50%), then adjustment logic 334.19 may modify video capture operations. In some embodiments, additional and/or alternative logical rule sets for applying object detection event parameters to modifying video capture, triggering PTZ movement toward a predicted intercept location with the camera field of view, and/or changing data storage and/or object detection parameters may be included in adjustment logic 334.19.

Peer coordination logic 334.20 may be initialized following a successful exchange between peer video cameras identified by query engine 334.8 and initiated by peer camera alert 334.17 and received by alert response handler 334.18. For example, alert response handler 334.18 may be configured to send a response message to peer camera alert 334.17, which may include additional metadata for the historical object detection event and indicate availability for peer coordination. Availability for peer coordination may be determined by peer coordination logic 334.20 based on the current state of the video camera (e.g., not actively capturing a higher-priority object type) and security settings that allow sharing metadata with the video camera that initiated the alert. Peer coordination logic 334.20 may then monitor real-time object detection metadata to determine additional object detection events and corresponding metadata to share with the other camera. For example, each time one of the cameras detects the object of interest or determines additional gradients/features related to the object of interest, that updated object detection event metadata may be sent to the other camera using message interface 332.1 and the network addresses identified in the initial exchange. Peer coordination logic 334.20 may be activated on both cameras after the initial alert and response and may continue for a predetermined time window after no additional detection events for the object of interest or interruption by a higher priority monitoring task for either camera.

Upload manager 334.21 may include logic for coordinating with metadata manager 334.12 to selectively upload object detection event metadata to the peer metadata datastore. For example, using datastore address 334.9, upload manager 334.21 may send upload messages for each object detection event that meets the storage criteria for the peer metadata datastore to the datastore server. Upload manager 334.21 may include a set of criteria for each object type that includes confidence values and other parameter thresholds for selecting among object detection events for upload. Upload manager 334.21 may use similar parameter logic to parameter logic 334.14 to select relevant metadata to include in the upload metadata for a new object detection event entry in the datastore. In some configurations, upload manager 334.21 may include logic for generating the key format and value format used by the datastore and the upload message may include the key-value data to be added to the datastore using an appropriate put command for the datastore protocols. In some configurations, upload manager 334.21 and query engine 334.8 may operate sequentially for the same object detection event to both add the new event entry to the datastore and query the datastore for related events.

Video storage interface 336 may include storage interface protocols and a set of functions, parameters, and data structures for managing storage of video data 320.1 in non-volatile memory 320, such as a storage device in or accessible to video camera 300, for later retrieval and use by access/display manager 338 and/or analytics engine 340. For example, video storage interface 336 may write camera video stream data from video data buffers and/or storage path video data from video capture interface 334 to non-volatile memory 320. In some embodiments, audio data may be stored in separate audio data files or objects and/or as synchronized audio data in audio tracks or channels of video data 320.1. In some embodiments, video storage interface 336 may include a storage manager 336.1 configured to manage video storage space in non-volatile memory 320 in accordance with one or more operating modes 334.5, data retention and/or data archiving schemes. For example, video camera 300 may support continuous and/or triggered recording of video data and storage manager 336.1 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. In some embodiments, storage manager 336.1 may support different storage locations for high quality video 320.2 captured during active video capture modes and low quality video 320.3 captured during passive video capture modes. In some configurations, video storage interface 336 may also include or interface with metadata manager 334.12 to receive and store video metadata as tags or metadata tracks in the video data or in an associated metadata table, file, or similar data structure associated with the corresponding video data objects.

Access/display manager 338 may include APIs and a set of functions, parameters, and data structures for displaying video from video capture interface 334 and/or video storage interface 336 to a user display application, such as a surveillance application operating on another system. For example, access/display manager 338 may include a monitoring or display configuration for displaying one or more video streams in real-time or near real-time on a graphical user display of a user device and/or receive video navigation commands from the user device to selectively display stored video data from non-volatile memory 320. In some embodiments, access/display manager 338 may maintain an index of real-time/near real-time video streams and/or stored or archived video streams that are available for access by a surveillance application. In some embodiments, the video index may include a corresponding metadata index that includes video data parameters (e.g., time, location, camera identifier, format, low light/normal light, etc.), detected audio and video event metadata (event time, location, type, parameters, etc.), and/or video management parameters (expiration, active/archive, access control, etc.) for use in displaying and managing video data. Access/display manager 338 may be configured to support surveillance application when instantiated in a computing device, such as a network video recorder or central control server, via a network within a LAN, WAN, VPN, or the internet.

Analytics engine 340 may include interface protocols, functions, parameters, and data structures for analyzing video data to detect video events, particularly object detection events, add them to video metadata, and/or raise alerts to video capture interface 334 and/or other systems, such as through a surveillance application. For example, analytics engine 340 may be an embedded firmware application and corresponding hardware in video camera 300 configured for local analysis of video data captured by the video cameras and may be integral to or accessible by surveillance controller 330. In some embodiments, analytics engine 340 may operate in real-time or near real-time on video data received by video capture interface 334, delayed processing of video data stored by video storage interface 336, and/or a combination thereof based on the nature (and processing requirements) of the video events, volume of video to be processed, operating mode, object detection priority, and other factors. In some embodiments, video camera 300 may include a plurality of analytics engines configured for different types of events, objects, or object parameters and corresponding event detection algorithms or models.

In some embodiments, analytics engine 340 may include a plurality of hardware and/or software modules configured to use processor 312 and memory 314 to handle or manage defined operations of analytics engine 340. Analytics engine 340 may also include specialized hardware, such as processors, logic circuits, and memory devices, configured specifically for machine learning model processing using limited resources. For example, a specialized image processing circuit configured for one or more TinyML object detectors may be included in the circuitry of the controller electronics executing surveillance controller 330 and analytics engine 340. Analytics engine 340 may include an event manager 342 and analytical model library 344. Analytics engine 340 may be configured to run one or more object detection algorithms for determining, tagging, and/or initiating alerts or other actions in response to detected object detection events. In some embodiments, analytics engine 340 may be configured to tag or build metadata structures that map detected events to timestamp and/or image location markers for the video stream from which they are detected. For example, analytics engine 340 may use motion, tripwire, object recognition, facial recognition, audio detection, speech recognition, and/or other algorithms to determine events occurring in a video stream and tag them in a corresponding metadata track and/or separate metadata table, such as video metadata 320.4, associated with the video data objects in video data 320.1.

Event manager 342 may include storage interface and/or buffer interface protocols and a set of functions, parameters, and data structures for processing target video streams for predefined event types and updating or adding metadata parameters describing the detected video events. For example, event manager 342 may be configured to process the incoming video stream for surveillance controller 330 and/or selectively process video data based on user selections (through a surveillance application) or metadata criteria received from the video capture interface 334. In some embodiments, event manager 342 may include, support, or supplement object detection by surveillance controller 330, such as object detection events from object detector 334.7. In some embodiments, event manager 342 may include a video selector 342.1 configured to select target video streams or video data sets for analysis, including associated audio data. For example, video selector 342.1 may identify a real-time video stream for near real time analysis or a bounded video data set, such as video with timestamps between beginning and ending time markers and/or including a defined set of metadata parameters. Video selector 342.1 may be used to process the same video stream through multiple object detection or classification models, as processing resources allow. Event manager 342 may include an event type selector configured to determine one or more event types to be detected from the selected video data. For example, an analytics configuration may be configured to analyze the selected video stream for a predefined set of object detection (including classification and/or recognition models). Each event type may map or correspond to an analytical model type, set of parameters, and one or model weights for defining an object detection algorithm stored in analytical model library 344 for use by analytics engine 340 to detect potential object detection events.

Analytical model library 344 may include an API and set of functions, parameters, and data structures for storing a plurality of analytical models for use by analytics engine 340 in processing video data. For example, analytical model library 344 may include a plurality of trained analytical models and corresponding event detection algorithms for different event types, target object classes (e.g., cars, license plates, equipment, people, etc.), and/or training conditions. In some embodiments, analytical model library 344 may also support audio analytical models and/or combined video with audio analytical models. Each analytical model may include a set of base equation(s) for the analytical model type, set of target parameters, and one or model weights that determine the event detection algorithm that will be used for the event detection processing. In some embodiments, at least some analytical models may be machine learning based models trained based on one or more sets of relevant reference data. For example, the base equations may be trained using the reference data sets to determine the model weights to be used in the resulting analytical model. Trained analytical models may be deployed in analytics engine 340. In some embodiments, analytics engine 340 may include or access training services for generating (training) or updating (retraining) analytical models in analytical model library 344.

In some embodiments, analytical model library 344 may include at least one object detection model 344.1. As used herein, object detection is used broadly to include: detection-only models that return an object detected result and confidence (with or without bounding box or other location information) for a specific object type; object classification models that classify objects according to object types and may be used to determine additional features or gradients for an object, including multi-classifier models (e.g., color classifiers, car model classifiers, etc.); and object recognition models that compare detected objects to specific reference objects to identify a particular object (such as facial recognition, license plate readers, etc.). For example, a motor vehicle recognition model may apply a set of weighted parameter values representing the relationships among sets of feature vectors for comparison with reference data (such as sets of feature vectors for known motor vehicles) and determination of a probabilistic reliability or correlation factor. Analytical model library 344 may include or access object reference data 344.2 for matching detected objects with previously identified (or recognized) reference objects. For example, the motor vehicle recognition model may be applied to a reference database of relevant motor vehicle images and/or feature sets extracted therefrom to provide vehicle reference data. In some embodiments, for any given detected object, object recognition model 344.1 may return one or more recognized matches and a corresponding reliability value. For example, the motor vehicle recognition model may return one or more known individuals from the reference data and corresponding reliability values, assuming at least one match is found that meets a threshold reliability value. In some configurations, the video event parameters for an initial object detection event may be used as reference data for matching a similar object detected on other video data from cameras. For example, once an object of interest is detected, the bounding box and image data it contains may be designated as reference data for subsequent object recognition calculations of other cameras detecting an object of the same type in response to exchanging object detection event metadata including the image data.

Figure 4:
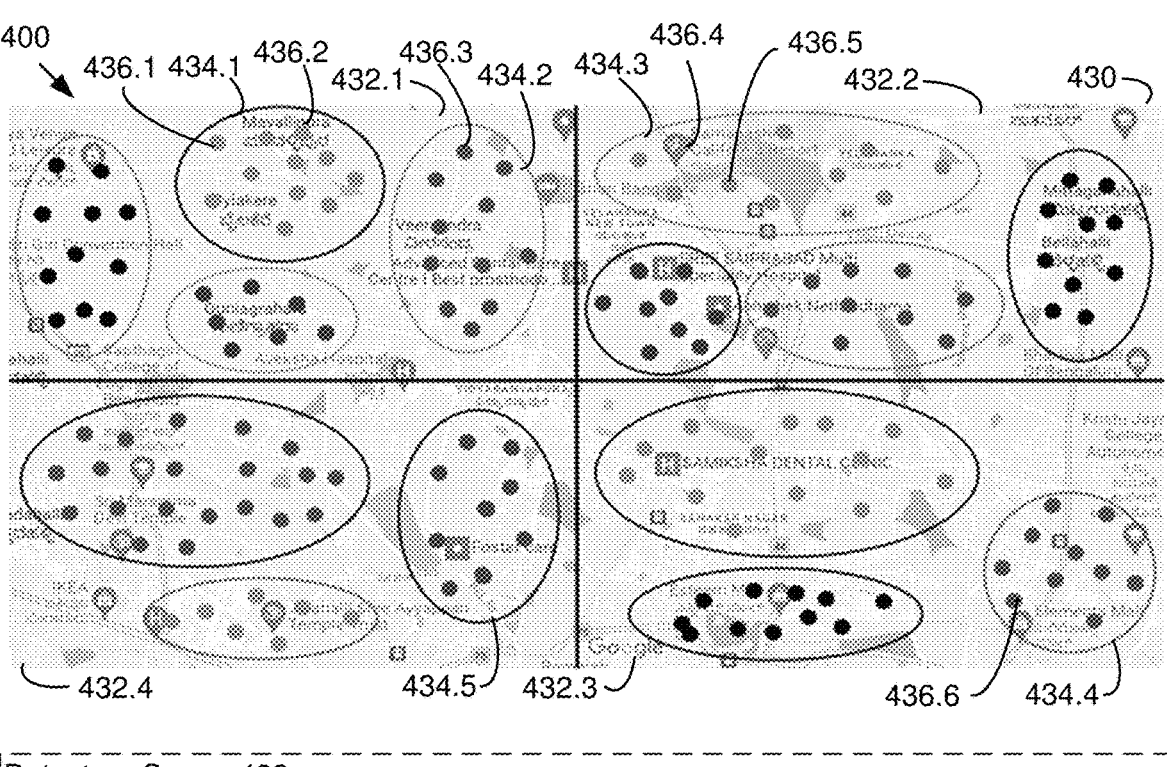
FIG. 4 schematically illustrates a region monitored by multiple groups of networked video cameras and a datastore server supporting the region for use with the computer-based surveillance systems of FIGS. 1-3.
Figure 4:
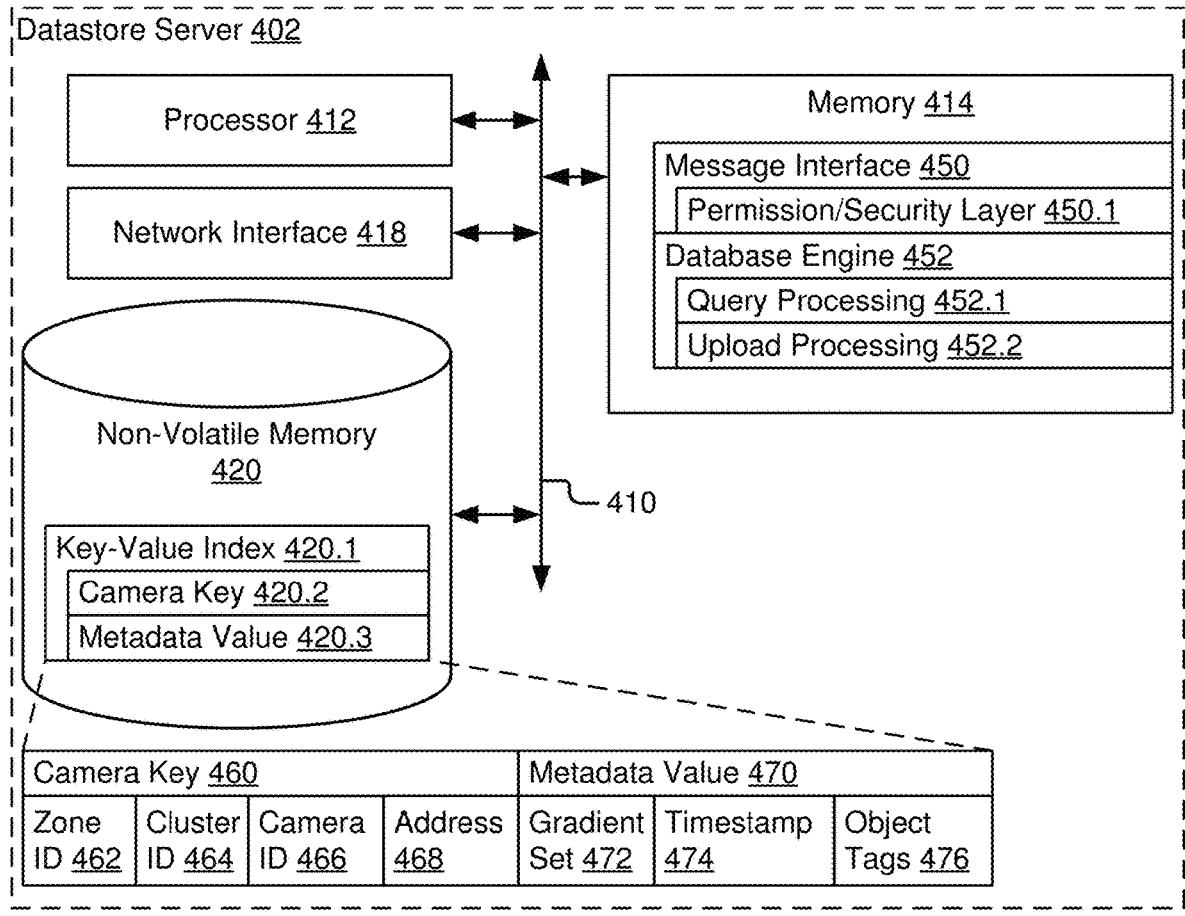

FIG. 4 schematically shows selected modules of a datastore server 402 configured for supporting a set of networked video camera groups 400 in a region 430 using a peer metadata datastore. Datastore server 402 may incorporate elements and configurations similar to those shown in FIGS. 1-2. For example, datastore server 402 may be configured as a network server or network metadata storage supporting a peer metadata datastore, such as a metadata database or key-value data structure. In the example shown, datastore server 402 may interface with camera groups allocated to geographic zones 432.1, 432.2, 432.3, and 432.4 in region 430. In some embodiments, video cameras 436 may be configured for video capture, similar to video cameras 110 or video camera 300 to interact with datastore server 402 over a network, such as network 102. For example, a video camera and its embedded or attached compute resources may be configured with some or all functions of surveillance controller 330 and analytics engine

340 and use datastore server 402 as a resource for establishing peer-to-peer communication in response to object detection events.

Region 430 is shown as a map area where multiple camera groups or clusters have been deployed in specific physical locations and those clusters have then been assigned to geographic zones. Each zone 432 includes at least one cluster 434 and each cluster includes a set of video cameras 436. For ease of use, not all clusters 434 and cameras 436 are individually labeled—shaded circles correspond to video cameras and are grouped within clusters represented by ovals surrounding that set of video cameras. Zones 432 correspond to the quarters of the map area. Each video camera cluster 434 may include a plurality of networked video cameras 436 as described above. In some configurations, each video camera 436 may be assigned a unique camera identifier and have a corresponding network address for communication with that video camera. Each video camera cluster 434 may be assigned a unique cluster identifier corresponding to the set of video cameras within that cluster. Each zone 432 may be assigned a unique zone identifier corresponding to the set of video camera clusters within that zone. This is one example of a hierarchical topology for deploying networked video cameras. Camera hierarchies may include any number of layers and corresponding group/layer identifiers, such as clusters with cluster identifiers and zones with zone identifiers. Other topologies are possible and may assign cameras to camera groups based on location, function, configuration, deployment type, time of deployment, and other factors.

Datastore server 402 may include a bus 410 interconnecting at least one processor 412, at least one memory 414, and at least one interface, such as network interface 418. Bus 410 may include one or more conductors that permit communication among the components of datastore server 402. Processor 412 may include any type of processor or microprocessor that interprets and executes instructions or operations and may include multiple processors operating alone or in combination to execute the operations described herein. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element. Non-volatile memory 420 may include one or more data storage devices configured to store video metadata for the networked video cameras in a corresponding data structure, such as metadata structured in a key-value architecture including a key-value index 420.1 comprised of camera keys 420.2 and metadata values 420.3.

Datastore server 402 may include a plurality of modules or subsystems that are stored and/or instantiated in memory 414 for execution by processor 412 as instructions or operations. For example, memory 414 may include message interface 450 configured for communication with the networked video cameras. Memory 414 may include a database engine 452 configured for managing access to metadata stored in non-volatile memory 420.

Message interface 450 may include interface protocols, functions, parameters, and data structures for receiving messages from video cameras 436 and sending appropriate responses to those video cameras. For example, message interface 450 may include a messaging protocol for sending or exchanging messages with video cameras and/or other system resources, such as a network video recorder or central control system. In some configurations, message interface 450 may use internet protocol, master-slave, and/or multi-master messaging over network interface 418 to send messages to selected cameras or other systems. In some configurations, application-level messaging may be used to send, parse, and respond to messages and enable the server to control access to video camera metadata, both for upload and query operations from the video cameras. In some configurations, message interface 450 may be configured with networked video camera information that includes video camera identifiers and network addresses for each video camera 436 to enable datastore server 402 to recognize messages from networked video cameras in its region 430. Message interface 450 may include a permission or security layer 450.1 configured to selectively control access to the metadata in non-volatile memory 420 based on the credentials and security protocols established between datastore server 402 and video cameras 436. For example, messaging to and from the video cameras may occur on a VPN using secure messaging protocols that validate video camera credentials and security keys prior to enabling access to the database. In some configurations, permissions may include mapping video camera identifiers to read-only permission to metadata from other video cameras and read/write/delete permissions for their own uploaded metadata. Additionally, permission/security layer 450.1 may be configured to limit access among clusters, zones, or specific video cameras or metadata for privacy reasons.

Database engine 452 may include interface protocols, functions, parameters, and data structures for controlling access to the data structure storing metadata in non-volatile memory 420. For example, database engine 452 may include a database application running on datastore server 402 in compliance with one or more database standards, such as structured query language (SQL) server. Database engine 452 may include a plurality of hardware and/or software modules configured to use processor 412 and memory 414 to handle or manage defined operations of database engine 452. For example, database engine 452 may include query processing logic 452.1 configured to process queries from the video cameras against the metadata stored in non-volatile memory 420 and upload processing logic 452.2 configured to process metadata uploads from the video cameras to add metadata to non-volatile memory 420. Query processing 452.1 and upload processing 452.2 may use established database commands and syntax for the database configuration implemented in non-volatile memory 420.

In some configurations, the peer metadata datastore in datastore server 402 may be stored in a key-value architecture and corresponding data structures in non-volatile memory 420. The key-value architecture may be based on specific key and value data structures known to both datastore server 402 and the networked video cameras to structure camera metadata corresponding to object detection events or other video events in the datastore. For example, camera metadata may be structured as entries corresponding to object detection events and store a set of metadata that identifies the object detection event and the associated video camera that detected the event. In some configurations, the key for each object detection event may correspond to the video camera that detected the event. For example, camera key 420.2 may comply with a camera key format 460 that includes a zone identifier 462, a cluster identifier 464, and a camera identifier 466 that identified a specific video camera and its location in a hierarchical topology of the networked video cameras. Camera key format 460 may also include a network address 468 for the video camera. In some configurations, the value for each object detection event may correspond to a set of metadata values describing the object detection event. For example, metadata value 420.3 may comply with a metadata value format 470 that includes a set of ordered metadata fields or tagged metadata values describing the object detection event. Metadata value format 470 may support different types of metadata values, such as a gradient set 472 of metadata parameters corresponding to gradients or features returned by the object detection model, a timestamp parameter 474 corresponding to the timestamp (s) of the video frame or frames in terms of a local or global timestamping configuration that uniquely identifies frames of video data captured by a particular video camera, and object tags 476 corresponding to one or more object tags (such as object type and/or one or more feature classification parameters of the object, such as bounding box values, confidence values, classifier or recognition tags, etc.). Key-value architecture may support variable length metadata values based on a set of metadata values selected by video cameras to describe the object detection events they are configured to record in the datastore for later search and retrieval by other video cameras.

FIG. 5 illustrates a flowchart of a method 500 for processing video data and facilitating peer-to-peer communication between video cameras. The method 500 may be executed by one or more video cameras in a surveillance system, such as video cameras 110 in surveillance system 200 or video camera 300. The method 500 may enable video cameras to identify relevant peer cameras and initiate communication based on shared object detection events. By executing method 500, a video camera may coordinate its video capture operations with peer cameras to improve surveillance coverage of objects of interest in a decentralized manner without requiring prior knowledge of the peer video camera or its configuration.

At block 510, video data captured by a video camera may be processed through object detector. For example, object detector 334.7 of video camera 300 may analyze incoming video frames to identify and classify objects of interest within the camera's field of view.

At block 512, an object of interest may be detected in the video data. For example, object detector 334.7 may identify a person or vehicle in the video frame and determine that it matches predefined criteria for objects of interest.

At block 514, metadata for the object detection event may be determined. For example, metadata manager 334.12 of video camera 300 may extract relevant features, timestamps, and classification tags associated with the detected object to create a comprehensive metadata set.

At block 516, a determination may be made as to whether the object detection meets upload criteria. For example, upload manager 334.21 of video camera 300 may evaluate the confidence level and relevance of the detected object against predefined thresholds to decide if the event warrants sharing with the peer metadata datastore.

At block 518, a key for the camera may be determined. For example, upload manager 334.21 may generate a unique identifier for video camera 300, potentially incorporating its zone ID, cluster ID, and camera ID as defined in the camera key format 460.

At block 520, a set of metadata may be selected for the value of the object detection event entry. For example, upload manager 334.21 may choose relevant parameters from the object detection event, such as gradients, timestamps, and object tags, to populate the metadata value format 470.

At block 524, the key-value pair for the object detection event may be uploaded to a peer metadata datastore. For example, upload manager 334.21 may send an upload message 244 containing the formatted key-value pair to the peer metadata datastore 210 via the network interface 318.

At block 526, a determination may be made as to whether the object detection event meets peer search criteria. For example, query engine 334.8 may evaluate the significance and urgency of the detected object against predefined thresholds to decide if searching for peer cameras is warranted.

At block 528, a query based on the set of metadata may be sent to the peer metadata datastore. For example, query engine 334.8 may construct and send a query message 246 containing key object features to the peer metadata datastore 210, seeking similar recent object detections.

At block 530, a response may be received indicating any peer video cameras with matching object detection events. For example, response handler 334.11 may process a response message 248 from peer metadata datastore 210, extracting metadata for object detection events of peer cameras that have detected similar objects.

At block 532, the network address for the peer video camera may be determined. For example, peer camera alert 334.17 may extract the network address from the response message 248 and prepare it for use in establishing peer-to-peer communication.

At block 534, peer-to-peer communication may be initiated with the peer video camera using the network address. For example, peer camera alert 334.17 may generate and send an alert message 250.1 to the identified peer camera, initiating coordination for modifying video capture parameters to detect and track the object of interest across video camera fields of view.

FIG. 6 illustrates a flowchart of a method 600 for coordinating video monitoring between peer video cameras. The method 600 may be executed by one or more video cameras in a surveillance system, such as video cameras 110 in surveillance system 200 or video camera 300. Method 600 may enable video cameras to respond to alerts from peer cameras and adjust their operations based on shared metadata. By executing method 600, a video camera may adapt its video capture and object detection parameters to increase the likelihood of capturing additional video data for objects of interest detected by other cameras in the network.

At block 610, an alert message may be received from a peer video camera. For example, alert response handler 334.18 of video camera 300 may receive an alert message 250.1 from another video camera through the network interface 318.

At block 612, a network address and camera identifier may be determined from the alert message. For example, alert response handler 334.18 may extract the network address and camera identifier of sending video camera from the received alert message 250.1.

At block 614, a timestamp and object tag may be determined from the alert message. For example, alert response handler 334.18 may parse alert message 250.1 to identify the timestamp of the object detection event and the object classification tag assigned by the video camera before it uploaded the corresponding metadata to the peer metadata datastore.

At block 616, camera metadata may be searched for an object detection event corresponding to the timestamp and object tag. For example, metadata manager 334.12 may query video event index 334.13 to locate a matching object detection event in the local video metadata 320.4.

At block 618, a set of metadata for the object detection event may be determined. For example, metadata manager 334.12 may retrieve the full set of metadata associated with the matching object detection event, including video parameters 320.5 and object parameters 320.6.

At block 620, peer video camera credentials for metadata access may be evaluated. For example, security layer 334.16 may verify the authentication and authorization of peer video camera that sent the alert to access additional metadata, which may include features or image data not provided in the metadata datastore upload. If the authentication and authorization credentials are not met, then method 600 may end without sending additional metadata or establishing coordination with the other camera.

At block 622, the set of metadata for the object detection event may be sent to the peer video camera. For example, alert response handler 334.18 may construct a response message containing the retrieved metadata and send it to the video camera that sent the alert using the network address determined at block 612. In some cases, method 600 may end without further coordination between the video cameras. The video camera that sent the alert may selectively execute blocks 628-634 based on the set of metadata in the response providing additional metadata relevant to monitoring the object of interest.

At block 624, coordinated video monitoring may be initiated with the peer video camera. For example, peer coordination logic 334.20 may establish a communication channel with video camera for ongoing exchange of object detection information.

At block 626, metadata may be exchanged with the peer video camera for similar object detection events. For example, peer coordination logic 334.20 may continuously share updates on object detections and tracking with the peer video camera for a coordination time period, such as an operating window during which the object of interest is visible to one or both cameras.

At block 628, video capture parameters may be determined based on object detection event metadata. For example, adjustment logic 334.19 may analyze the shared metadata to identify optimal camera settings for capturing the object of interest.

At block 630, object detection parameters may be determined based on object detection event metadata. For example, adjustment logic 334.19 may use the shared metadata to fine-tune the object detector 334.7 for improved detection of the specific object type.

At block 632, video capture and/or object detection operations may be modified. For example, video capture interface 334 may adjust video capture parameters for positioning the camera and encoding video data and object detector 334.7 may update its detection thresholds based on the parameters determined at blocks 628 and 630.

At block 634, video data may be captured using the modified operations. For example, video stream manager 334.1 may begin capturing video data using the adjusted video capture parameters and object detector 334.7 may begin processing the captured video using object detection parameters to increase the likelihood of detecting and tracking the object of interest.

FIG. 7 illustrates a flowchart of a method 700 for storing and processing object detection event metadata to support coordination by networked video cameras. Method 700 may be executed by a datastore server, such as datastore server 402. Method 700 may enable efficient storage, retrieval, and sharing of metadata related to object detection events among networked video cameras without individual cameras needing to be configured for communication with each other video camera or aware of the overall topology of the networked video cameras. By executing method 700, the datastore server may facilitate peer-to-peer coordination between video cameras based on shared object detection events, improving overall surveillance coverage.

At block 710, a metadata upload may be received from an uploading video camera for an object detection event. For example, message interface 450 of datastore server 402 may receive an upload message containing metadata for a newly detected object from a networked video camera.

At block 712, a key for the uploading video camera may be determined. For example, upload processing logic 452.2 may extract or generate a unique key for the video camera that sent the upload based on its zone ID, cluster ID, and camera ID as defined in the camera key format 460.

At block 714, the metadata value may be determined. For example, the upload processing logic 452.2 may parse the received metadata to extract relevant information such as object features, timestamps, and classification tags to populate the metadata value format 470.

At block 716, the object detection event key-value pair may be stored in non-volatile memory. For example, database engine 452 may write the formatted key-value pair to the key-value index 420.1 in the non-volatile memory 420 of datastore server 402.

At block 718, a metadata query may be received from a requesting video camera. For example, message interface 450 may receive a query message from a video camera seeking information about similar object detection events.

At block 720, the metadata query may be processed against values in the key-value datastore. For example, query processing logic 452.1 may search the metadata values 420.3 in the key-value index 420.1 for entries matching the criteria specified in the query.

At block 722, key-value entries matching object detection event(s) may be determined. For example, query processing logic 452.1 may return one or more key-value pairs in the key-value index 420.1 that meet the query criteria.

At block 724, the key and timestamp matching object detection event(s) may be determined. For example, query processing logic 452.1 may extract camera keys 420.2 and corresponding timestamps from the identified matching entries.

At block 726, permissions and security for the requesting video camera may be evaluated. For example, permission/security layer 450.1 may verify that the requesting video camera has the necessary credentials to access the requested metadata.

At block 728, a response containing the key and timestamp may be returned to the requesting video camera. For example, message interface 450 may send a response message to the requesting video camera containing the keys and metadata values of the matching object detection events, enabling it to initiate peer-to-peer communication with the relevant cameras.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Any combination of processors, CPUs, controllers, or similar hardware circuits may be used to execute instructions stored on computer-readable mediums. For example, processors, CPUs, controllers, and similar hardware circuits described herein may be embodied in or include one or more hardware processor packages and/or processor cores that operate alone or in combination to execute instructions and carry out the described functions. In some configurations, these processors or groups of processors may be standalone circuits in their own package, integrated with other hardware elements in a system on a chip (SOC), application specific integrated circuit (ASIC), or similar device, and/or integrated through a communication bus in a printed circuit board assembly (PCBA).

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:

a first video camera comprising:

a network interface configured for communication over a network, wherein the first video camera is a video camera of a plurality of networked video cameras configured for communication over the network;

an image sensor configured to selectively capture video data;

a non-volatile storage medium configured to store video data captured by the image sensor;

a controller circuit configured to:

detect, from the video data, an object of interest;

determine, based on the object of interest, a set of metadata corresponding to the object of interest;

send, over the network and to a peer metadata datastore, a query comprising selected metadata from the set of metadata;

receive, responsive to the query, at least one peer camera identifier for at least one other video camera in the plurality of networked video cameras;

send, responsive to receiving the at least one peer camera identifier, an alert message to a second video camera of the at least one other video camera in the plurality of networked video cameras; and receive, responsive to the alert message and from the second video camera, a set of peer metadata for an object detection event by the second video camera.

2. The system of claim 1, further comprising:

the plurality of networked video cameras, wherein:

each video camera of the plurality of networked video cameras is configured with a network address;

the at least one peer camera identifier comprises at least one network address corresponding to that at least one other video camera; and sending the alert message to the second video camera uses the network address of the second video camera.

3. The system of claim 2, wherein, responsive to the alert message, a second video camera is further configured to determine, based on the alert message:

the network address for the first video camera;

a timestamp corresponding to the object detection event by the second video camera; and the set of peer metadata for the object detection event.

4. The system of claim 3, wherein the first video camera is further configured to, responsive to the set of peer metadata for the object detection event:

determine at least one video capture parameter from the set of peer metadata;

modify, based on the at least one video capture parameter, video capture operations; and capture, using the modified video capture operations, additional video data.

5. The system of claim 1, wherein:

the first video camera is further configured to:

determine at least one object detection event corresponding to the object of interest detected by the first video camera; and send, to the second video camera, at least one set of peer metadata for the at least one object detection event by the first video camera;

the second video camera is further configured to:

determine, based on the at least one set of peer metadata from the first video camera, the object detection event by the second video camera corresponding to the object of interest detected by the second video camera; and determine the set of peer metadata for the at object detection event by the second video camera; and the first video camera and the second video camera are further configured to modify corresponding video capture operations to increase a likelihood of capturing the object of interest.

6. The system of claim 1, further comprising:

the peer metadata datastore, wherein the peer metadata datastore comprises:

a non-volatile memory configured to store metadata from the plurality of networked video cameras structured in a key-value memory architecture; and a processor configured to:

receive metadata uploads from the plurality of networked video cameras;

store metadata from the metadata uploads in the key-value memory architecture;

process queries from the plurality of networked video cameras against the key-value memory architecture; and return, responsive to the queries, corresponding responses to the plurality of networked video cameras.

7. The system of claim 6, wherein:

a key of the key-value memory architecture comprises:

a peer camera identifier; and a network address corresponding to the peer camera identifier; and the corresponding responses comprise at least the network address of a video camera of the networked video cameras corresponding to a set of metadata in that query matching a set of metadata in the key-value memory architecture.

8. The system of claim 7, wherein the key of the key-value memory architecture further comprises at least one identifier corresponding to a hierarchical topology of the plurality of networked video cameras.

9. The system of claim 6, wherein:

a value of the key-value memory architecture comprises a set of metadata corresponding to an object detection event by a video camera of the plurality of networked video cameras indicated by a corresponding key; and the set of metadata comprises:

at least one gradient from a video frame corresponding to a detected object of interest in the video frame;

a timestamp for the video frame; and at least one object tag corresponding to the detected object of interest.

10. The system of claim 1, wherein the controller circuit comprises:

a processor;

a memory; and an object detection model configured for execution by the processor using the memory; and the object detection model comprises a neural network:

sized for the memory and processor using at least one process selected from:

quantization;

pruning; and model compression; and using pretrained parameters for the object of interest originating outside of the controller circuit.

11. A computer-implemented method, comprising:

detecting, by a first video camera and from video data captured by an image sensor of the first video camera, an object of interest, wherein:

the first video camera is a video camera among a plurality of networked video cameras configured for communication over a network; and each video camera of the plurality of networked video cameras comprises a non-volatile storage medium configured to store video data captured by an image sensor of that video camera;

determining, by the first video camera, at least one object detection event corresponding to the object of interest detected by the first video camera;

determining, by the first video camera and based on the object of interest, a set of metadata corresponding to the object of interest;

sending, by the first video camera to a peer metadata datastore over the network, a query comprising selected metadata from the set of metadata;

receiving, by the first video camera and responsive to the query, a peer camera identifier for a second video camera in the plurality of networked video cameras;

initiating, by the first video camera and responsive to receiving the peer camera identifier, network communication with the second video camera in the plurality of networked video cameras;

sending, by the first video camera to the second video camera, at least one set of peer metadata for the at least one object detection event by the first video camera, wherein the second video camera is configured to determine at least one object detection event corresponding to the object of interest detected by the second video camera; and receiving, by the first video camera and from the second video camera, at least one set of peer metadata for the at least one object detection event by the second video camera.

12. The computer-implemented method of claim 11, further comprising:

determining, by the first video camera and based on the peer camera identifier, a network address for the second video camera; and sending, by the first video camera, an alert message to the network address corresponding to the second video camera, wherein each video camera of the plurality of networked video cameras is configured with:

a corresponding network address for that video camera; and a corresponding peer camera identifier comprising the corresponding network address for that video camera.

13. The computer-implemented method of claim 12, further comprising, responsive to the alert message:

determining, by the second video camera and based on the alert message:

the network address for the first video camera; and a timestamp corresponding to an object detection event of the second video camera;

determining, by the second video camera and based on the timestamp, a set of peer metadata for the object detection event; and sending, by the second video camera to the first video camera, the set of peer metadata for the object detection event.

14. The computer-implemented method of claim 13, further comprising, responsive to receiving the set of peer metadata for the object detection event:

determining, by the first video camera, at least one video capture parameter from the set of peer metadata;

modifying, by the first video camera and based on the at least one video capture parameter, video capture operations; and capturing, by the first video camera and using the modified video capture operations, additional video data.

15. The computer-implemented method of claim 11, further comprising:

modifying, by the first video camera and based on the at least one set of peer metadata for the at least one object detection event by the second video camera, corresponding video capture operations to increase a likelihood of capturing the object of interest at the first video camera; and modifying, by the second video camera and based on the at least one set of peer metadata for the at least one object detection event by the first video camera, corresponding video capture operations to increase a likelihood of capturing the object of interest at the second video camera.

16. The computer-implemented method of claim 11, further comprising:

receiving, by the peer metadata datastore, metadata uploads from the plurality of networked video cameras;

storing, by the peer metadata datastore, metadata from the metadata uploads in a key-value memory architecture in a non-volatile memory of the peer metadata datastore;

processing, by the peer metadata datastore, queries from the plurality of networked video cameras against the key-value memory architecture; and returning, by the peer metadata datastore and responsive to the queries, corresponding responses to the plurality of networked video cameras.

17. The computer-implemented method of claim 16, further comprising:

comparing a set of metadata in a query to sets of metadata in the key-value memory architecture, wherein:

a key of the key-value memory architecture comprises:

a peer camera identifier; and a network address corresponding to the peer camera identifier; and the corresponding responses comprise the network address of a video camera of the networked video cameras corresponding to the set of metadata in that query matching a set of metadata in the key-value memory architecture having a key corresponding to that video camera.

18. The computer-implemented method of claim 17, wherein the key of the key-value memory architecture further comprises at least one identifier corresponding to a hierarchical topology of the plurality of networked video cameras.

19. The computer-implemented method of claim 16, wherein:

a value of the key-value memory architecture comprises a set of metadata corresponding to an object detection event by a video camera of the plurality of networked video cameras indicated by a corresponding key; and the set of metadata comprises:

at least one gradient from a video frame corresponding to a detected object of interest in the video frame;

a timestamp for the video frame; and at least one object tag corresponding to the detected object of interest.

20. A system, comprising:

a plurality of networked video cameras comprising a first video camera and a second video camera, wherein:

the plurality of networked video cameras is configured for communication over a network; and each video camera of the plurality of networked video cameras comprises a non-volatile storage medium configured to store video data captured by an image sensor of that video camera;

means for detecting, by the first video camera and from the video data captured by the image sensor of the first video camera, an object of interest;

means for determining, by the first video camera and based on the detected object of interest, a set of metadata corresponding to the object of interest;

means for sending, by the first video camera to a peer metadata datastore over the network, a query comprising selected metadata from the set of metadata, wherein the selected metadata comprises at least one gradient from a video frame corresponding to the detected object of interest in the video frame;

means for receiving, by the first video camera and responsive to the query, a peer camera identifier for a second video camera in the plurality of networked video cameras, wherein the second video camera was identified from the peer metadata datastore based on the at least one gradient corresponding to a stored gradient for a video frame captured by the second video camera; and means for initiating, by the first video camera and responsive to receiving the peer camera identifier, network communication with the second video camera in the plurality of networked video cameras.

* * * * *